(12) United States Patent
Tanibayashi et al.

(10) Patent No.: US 7,010,306 B1
(45) Date of Patent: Mar. 7, 2006

(54) LOCATION INFORMATION NOTIFYING METHOD AND LOCATION INFORMATION NOTIFYING APPARATUS

(75) Inventors: Youichi Tanibayashi, Fujisawa (JP); Koichi Takahara, Tokyo (JP); Masahiro Kaiwa, Funabashi (JP); Hiroyuki Yamamoto, Yokohama (JP); Kaoru Nakajima, Yokohama (JP); Ichiro Inaba, Nagoya (JP); Yuichiro Tsutsui, Tokyo (JP)

(73) Assignee: NTT Docomo, Inc., Tokyo (JP)

( * ) Notice: Subject to any disclaimer, the term of this patent is extended or adjusted under 35 U.S.C. 154(b) by 535 days.

(21) Appl. No.: 09/786,818

(22) PCT Filed: Jul. 31, 2000

(86) PCT No.: PCT/JP00/05142

§ 371 (c)(1),
(2), (4) Date: Mar. 9, 2001

(87) PCT Pub. No.: WO01/09731

PCT Pub. Date: Feb. 8, 2001

(30) Foreign Application Priority Data

Jul. 29, 1999 (JP) ................................. 11-214750
Sep. 7, 1999 (JP) ................................. 11-253670

(51) Int. Cl.
*H04Q 7/20* (2006.01)

(52) U.S. Cl. .............................. 455/456.1; 455/456.3; 455/456.5; 455/456.6; 455/432.1

(58) Field of Classification Search ............. 455/432.1, 455/432.2, 456.1, 456.2, 456.3, 456.5, 456.6
See application file for complete search history.

(56) References Cited

U.S. PATENT DOCUMENTS

| | | | |
|---|---|---|---|
| 5,043,736 A | 8/1991 | Darnell et al. ........... 342/357.1 |
| 5,337,242 A | 8/1994 | Yamamoto et al. | |
| 5,434,904 A | 7/1995 | Tsuzuki et al. | |
| 5,502,758 A | 3/1996 | Tsuzuki et al. | |
| 5,636,122 A | 6/1997 | Shah et al. .................. 701/207 |
| 5,652,570 A | 7/1997 | Lepkofker ............... 340/573.4 |
| 5,740,539 A | 4/1998 | Ishii | |
| 5,774,802 A * | 6/1998 | Tell et al. .................... 455/408 |
| 5,787,359 A | 7/1998 | Nagata | |
| 5,867,110 A | 2/1999 | Naito et al. | |
| 5,873,040 A | 2/1999 | Dunn et al. .............. 455/456.2 |
| 5,959,577 A | 9/1999 | Fan et al. .............. 342/357.13 |
| 6,091,956 A | 7/2000 | Hollenberg .............. 455/456.5 |
| 6,115,611 A | 9/2000 | Kimoto et al. ........... 455/456.3 |
| 6,122,520 A | 9/2000 | Want et al. ................. 455/456 |
| 6,138,003 A * | 10/2000 | Kingdon et al. ............ 455/410 |
| 6,169,897 B1 | 1/2001 | Kariya ....................... 455/426 |

(Continued)

FOREIGN PATENT DOCUMENTS

GB    2 322 248 A    8/1998

(Continued)

*Primary Examiner*—Stephen D'Agosta
(74) *Attorney, Agent, or Firm*—Brinks Hofer Gilson & Lione

(57) ABSTRACT

The present invention aims to provide a common platform for providing location information, which provision corresponds to network integration. In the present invention, a location information providing unit of a gateway server obtains from a position measuring center location information of mobile communication terminals. The location information of each mobile communication terminal may generated in different representational formats. A location information providing unit converts the obtained location information into representational formats that are capable of being handled by IP servers. Following conversion, the location information providing unit transmits the location information the IP servers.

62 Claims, 24 Drawing Sheets

U.S. PATENT DOCUMENTS

| | | |
|---|---|---|
| 6,208,866 B1 | 3/2001 | Rouhollahzadeh et al. ..... 455/456 |
| 6,226,522 B1 | 5/2001 | Higuchi ..................... 455/456 |
| 6,292,743 B1 | 9/2001 | Pu et al. ..................... 701/202 |
| 6,311,060 B1 | 10/2001 | Evans et al. ................. 455/426 |
| 6,332,127 B1 | 12/2001 | Bandera et al. ................ 705/14 |
| 6,353,398 B1 | 3/2002 | Amin et al. .................. 340/995 |
| 6,377,793 B1 | 4/2002 | Jenkins ....................... 455/412 |
| 6,381,465 B1 | 4/2002 | Chern et al. ................. 455/466 |
| 6,385,465 B1 | 5/2002 | Yoshioka ..................... 455/564 |
| 6,397,057 B1 | 5/2002 | Malackowski et al. ...... 455/414 |
| 6,400,956 B1 | 6/2002 | Richton ....................... 455/456 |
| 6,496,701 B1 * | 12/2002 | Chen et al. ................ 455/456.5 |
| 6,505,048 B1 | 1/2003 | Moles et al. ................. 455/456 |
| 6,519,466 B1 | 2/2003 | Pande et al. ................. 455/456 |
| 6,522,265 B1 * | 2/2003 | Hillman et al. .............. 340/988 |
| 6,580,904 B1 * | 6/2003 | Cox et al. ................. 455/456.2 |
| 6,609,005 B1 | 8/2003 | Chern ......................... 455/457 |
| 6,677,894 B1 | 1/2004 | Sheynblat et al. ........ 342/357.1 |
| 6,731,940 B1 | 5/2004 | Nagendran ............... 455/456.1 |
| 2003/0069029 A1 | 4/2003 | Dowling et al. ............ 455/456 |

FOREIGN PATENT DOCUMENTS

| | | | |
|---|---|---|---|
| GB | 2322248 | * | 8/1998 |
| JP | 63-199528 | | 8/1988 |
| JP | 3-120995 | | 5/1991 |
| JP | 4-213258 | | 8/1992 |
| JP | 5-83189 | | 4/1993 |
| JP | 5-102906 | | 4/1993 |
| JP | 6-165246 | | 6/1994 |
| JP | 6-261150 | | 9/1994 |
| JP | 07-105494 | | 4/1995 |
| JP | 07-131852 | | 5/1995 |
| JP | 07-312774 | | 11/1995 |
| JP | 08-37682 | | 2/1996 |
| JP | 8-289355 | | 11/1996 |
| JP | 9-54895 | | 2/1997 |
| JP | 9-153054 | | 6/1997 |
| JP | 9-172672 | | 6/1997 |
| JP | 09-215041 | | 8/1997 |
| JP | 10-148542 | | 6/1998 |
| JP | 10-164643 | | 6/1998 |
| JP | 10-170625 | | 6/1998 |
| JP | 10-171727 | | 6/1998 |
| JP | 10-191409 | | 7/1998 |
| JP | 10-221106 | | 8/1998 |
| JP | 2868500 | | 12/1998 |
| JP | 11-27728 | | 1/1999 |
| JP | 11-27729 | | 1/1999 |
| JP | 11-41276 | | 2/1999 |
| JP | 11-51678 | | 2/1999 |
| JP | 11-53278 | | 2/1999 |
| JP | 11-94923 | | 4/1999 |
| JP | 2908406 | | 4/1999 |
| JP | 11-133135 | | 5/1999 |
| JP | 11-155025 | | 6/1999 |
| JP | 11-178047 | | 7/1999 |
| JP | 11-351903 | | 12/1999 |
| JP | 2000-4482 | | 1/2000 |
| JP | 2000-55686 | | 2/2000 |
| KR | 1998-031026 | | 7/1998 |
| WO | WO 98/54922 | | 12/1998 |

* cited by examiner

FIG. 4

| BASE STATION ID | IP SERVER 80A | IP SERVER 80B | ..... |
|---|---|---|---|
| BS0011 | X, Y | 1-1-1 TORANOMON, MINATO-KU | ..... |
| ..... | ..... | ..... | ..... |

FIG. 5

| AREA ID | IP SERVER 80A | IP SERVER 80B | ..... |
|---|---|---|---|
| AREA001 | X, Y | 1-1-1 TORANOMON, MINATO-KU | ..... |
| ..... | ..... | ..... | ..... |

FIG. 6

| SECTOR ID | IP SERVER 80A | IP SERVER 80B | ..... |
|---|---|---|---|
| SEC001 | X, Y | 1-1-1 TORANOMON, MINATO-KU | ..... |
| ..... | ..... | ..... | |

FIG. 7

| LATITUDE AND LONGITUDE | RECEIVERS |
|---|---|
| | IP SERVER 80A |
| | IP SERVER 80F |
| | IP SERVER 80K |
| | ..... |

FIG. 11

| AREA ID | REGION NAME |
|---------|-------------|
| AREA001 | EAST TOKYO |
| ⋮ | ⋮ |

FIG. 12

| SECTOR ID | REGION NAME |
|-----------|-------------|
| SEC001 | 1-CHOME, TORANOMON, MINATO-KU, TOKYO |
| ⋮ | ⋮ |

FIG. 13

| IP SERVER NAME | LOCATION INFORMATION PRECISION |
|----------------|-------------------------------|
| IP SERVER 90A | HIGH-PRECISION |
| IP SERVER 90B | MEDIUM-PRECISION |
| IP SERVER 90C | MEDIUM-PRECISION |
| ⋮ | ⋮ |

FIG. 16

```
<HTML>
<TITLE>SHOP INFORMATION IN YOUR VICINITY</TITLE>
<BODY>
ALLOW ME TO PROVIDE YOU WITH VARIOUS SHOP INFORMATION IN YOUR VICINITY. <BR>

<A HREF="http://xxx.co.jp/cgi-bin/restaurant.cgi?area=NULLAREA">RESTAURANT INFORMATION</A><BR>
<A HREF="http://xxx.co.jp/cgi-bin/movie.cgi?area=NULLAREA">MOVIE THEATER INFORMATION</A><BR>
<A HREF="http://xxx.co.jp/cgi-bin/artmuseum.cgi?area=NULLAREA">MUSEUM INFORMATION</A><BR>
<BR>
<A HREF="http://xxx.co.jp/cgi-bin/pushregist.cgi?uid=NULLID">REGISTRATION OF TRACKING INFORMATION PROVISION</A><BR>
<A HREF="http://xxx.co.jp/about.html">ABOUT THIS SERVICE</A><BR>
</BODY>
</HTML>
```

FIG. 17

ALLOW ME TO PROVIDE YOU WITH VARIOUS SHOP INFORMATION IN YOUR VICINITY.

RESTAURANT INFORMATION

MOVIE THEATER INFORMATION

MUSEUM INFORMATION

REGISTRATION OF TRACKING INFORMATION PROVISION

ABOUT THIS SERVICE

FIG. 19

| IP SERVER NAME | HOST NAME | SERVICE NAME | LOCATION INFORMATION DISCLOSURE FLAG | USER CONSENT FLAG |
|---|---|---|---|---|
| IP SERVER 500A | xxx.co.jp | POSITION RELATED INFORMATION PROVIDING SERVICE | ON | ON |
| IP SERVER 500B | yyy.co.jp | POSITION RELATED INFORMATION PROVIDING SERVICE | ON | OFF |
| IP SERVER 500C | zzz.co.jp | WIDE-AREA INFORMATION PROVIDING SERVICE | OFF | — |
| ⋮ | ⋮ | ⋮ | ⋮ | ⋮ |
| ⋮ | ⋮ | ⋮ | ⋮ | ⋮ |
| ⋮ | ⋮ | ⋮ | ⋮ | ⋮ |
| ⋮ | ⋮ | ⋮ | ⋮ | ⋮ |
| ⋮ | ⋮ | ⋮ | ⋮ | ⋮ |

FIG. 20

| BASE STATION ID | REGION CODE |
|---|---|
| BS001 ~ BS005 | CODE001 |
| ...... | ...... |
| ...... | ...... |
| ...... | ...... |
| ...... | ...... |
| ...... | ...... |

FIG. 21

| REGION CODE | REGION NAME | POSITION RELATED INFORMATION ||||||
|---|---|---|---|---|---|---|---|
| | | BUILDING NAME | ADDRESS | TELEPHONE NUMBER | EVENT | OTHER INFORMATION ||
| CODE001 | 1-CHOME, SHIBUYA-KU | RESTAURANT A | ⋮ | ⋮ | ⋮ | ⋮ ||
| | | ⋮ | ⋮ | ⋮ | ⋮ | ⋮ ||
| | | MOVIE THEATER B | ⋮ | ⋮ | ⋮ | ⋮ ||
| | | ⋮ | ⋮ | ⋮ | ⋮ | ⋮ ||
| | | MUSEUM C | ⋮ | ⋮ | ⋮ | ⋮ ||
| | | ⋮ | ⋮ | ⋮ | ⋮ | ⋮ ||
| | ⋮ | ⋮ | ⋮ | ⋮ | ⋮ | ⋮ ||
| | ⋮ | ⋮ | ⋮ | ⋮ | ⋮ | ⋮ ||
| | ⋮ | ⋮ | ⋮ | ⋮ | ⋮ | ⋮ ||
| ⋮ | ⋮ | ⋮ | ⋮ | ⋮ | ⋮ | ⋮ ||

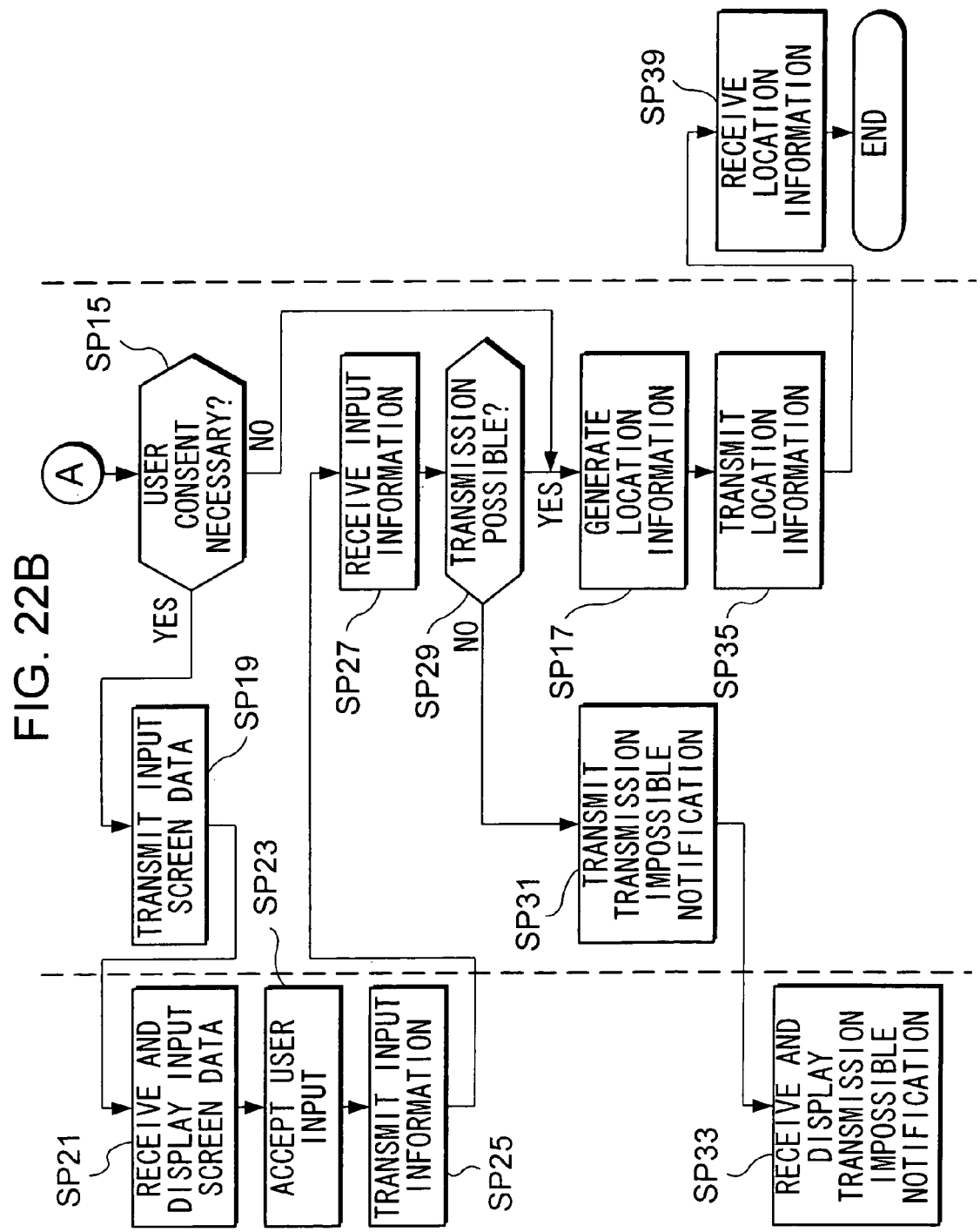

FIG. 23

| BASE STATION ID | MOBILE STATION ID |
|---|---|
| BS001 | MS09011111111 |
|  | MS09011111122 |
|  | MS09011111130 |
| BS002 | — |
| BS003 | MS09011111140 |
| ... | ... |
| ... | ... |
| ... | ... |
| ... | ... |

FIG. 24

| MOBILE STATION ID | POSITION REGISTRATION AREA ID |
|---|---|
| MS09011111111 | AREA0001 |
| MS09011111112 | AREA0011 |
| MS09011111113 | AREA0050 |
| ... | ... |
| ... | ... |
| ... | ... |
| ... | ... |
| ... | ... |
| ... | ... |

FIG. 25

| MOBILE STATION ID | PSEUDO ID |
|---|---|
| MS09011111111 | 00ZDGVXAKLLG |
| ... | ... |
| ... | ... |
| ... | ... |
| ... | ... |
| ... | ... |
| ... | ... |

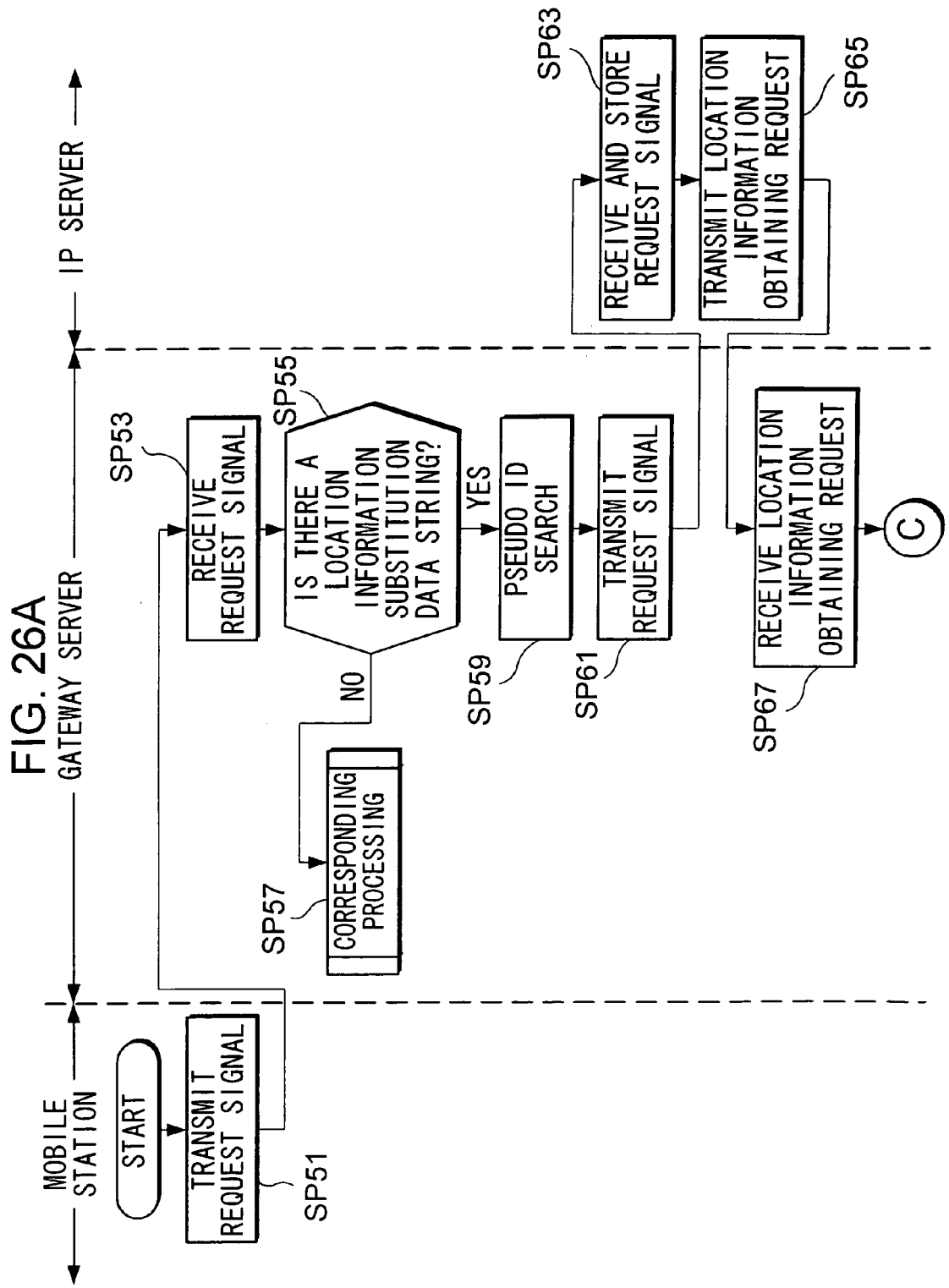

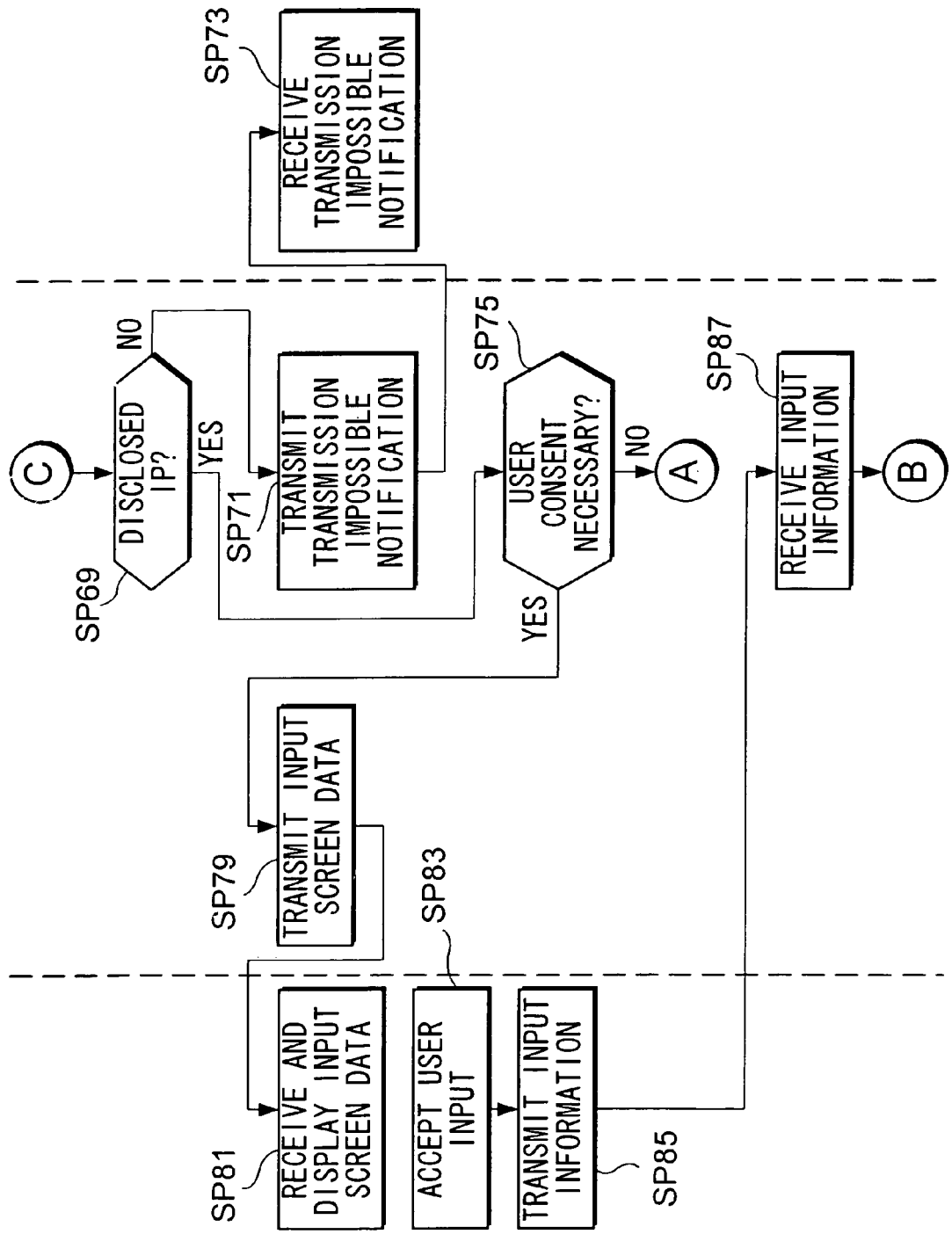

FIG. 28

| MOBILE STATION ID | LOCATION INFORMATION DISCLOSURE IP SERVER |
|---|---|
| MS09011111111 | IP SERVER 500A |
| | IP SERVER 500B |
| | IP SERVER 500H |
| | ......... |
| MS09011111112 | IP SERVER 500D |
| | IP SERVER 500M |
| | ......... |
| ......... | ......... |
| | |
| | |
| | |

FIG. 29

| ID OF MOBILE STATIONS WHICH DO NOT DISCLOSE LOCATION INFORMATION |
|---|
| MS09011111122 |
| MS09011155555 |
| ......... |
| ......... |
| ......... |

LOCATION INFORMATION NOTIFYING METHOD AND LOCATION INFORMATION NOTIFYING APPARATUS

TECHNICAL FIELD

The present invention relates to a location information notifying method and a location information notifying apparatus for notifying location information of a mobile communication terminal.

BACKGROUND ART

Mobile communication networks for mobile terminals such as cellular telephones are capable of obtaining the current position of a mobile communication terminal. In recent years, various types of systems for performing information providing services using location information obtained by such mobile communication networks have been proposed. For example with PHS (Personal Handyphone System) networks, it is possible to determine within which base station wireless zone a mobile communication terminal is currently used, and a system for providing a position tracking service using this location information is known.

Also, a system wherein a GPS (Global Positioning System) is installed for mobile communication terminals and location information obtained by the GPS is used for a service has also been proposed.

The obtained location information of the mobile communication terminal differs in representational format according to the position detection method employed by the mobile communication network. For example, with a PHS network, the location information is identification information (hereafter referred to as "base station ID") for identifying base stations managing wireless zones where mobile communication terminals are used, and with GPS, the location information is in the format of latitude and longitude, obtained by measuring the positions of mobile communication terminals.

On the other hand, the representational format for the desired location information, the precision thereof, and communication protocol differ between the computer systems which use such location information and provide various types of services.

For example, there may be cases wherein handling of the location information in the latitude-and-longitude representational format is desired by the computer system application, or there may be cases wherein obtaining the location information in the representational format corresponding to administrative district is desired. Also, for example, computer systems which provide position tracking services require relatively high-precision location information, but computer systems which provide weather forecast information at the location of where the mobile communication terminal require only relatively low-precision location information. Further, even in the event that the representational format of the location information is the same for the mobile communication terminal side and the computer system side, the method for obtaining the location information by the computer systems differs according to the communication protocol which the application of the computer system supports.

Thus, as long as the representational formats and communication protocols for location information differ according to the mobile communication network and the computer using the location information, services dealing with network integration, which have been rapidly progressing in recent years, cannot be provided.

DISCLOSURE OF INVENTION

According to one aspect of the present invention, the position of a mobile communication terminal is detected and location information is generated, following which, in the event of notifying a first computer of location information, the representational format of the location information at the time of generating the location information is converted into a first representational format which the first computer is capable of handling, and on the other hand, in the event of notifying a second computer of location information, the representational format of the location information at the time of generating the location information is converted into a second representational format which the second computer is capable of handling, and notification is made. Thus, a common platform for providing location information dealing with integration of networks from the perspective of representation format of location information, can be provided.

According to another aspect of the present invention, following detection of the position of the mobile communication terminal, the computer generates and notifies location information having a precision which the computer requires. Thus, a common platform for providing location information dealing with integration of networks from the perspective of precision of location information, can be provided.

Also, according to another aspect of the present invention, the position of the mobile communication terminal is detected and location information is generated, and the location information is added to data transmitted from the mobile communication terminal to the computer, thereby notifying the computer of the location information. Thus, location information of the mobile communication terminal can be supplied to various computers in a form not dependent on the specifications of the mobile communication terminal.

Also, according to another aspect of the present invention, upon receiving a request signal from the computer requesting obtaining of the location information of the mobile communication terminal, the position of the mobile communication terminal is detected in response to this request signal and location information is generated, and this location information is notified to the computer. Thus, the location information of the mobile communication terminal can be supplied to various computers as a standard interface protocol, in a form not dependent on the specifications of the mobile communication terminal.

BRIEF DESCRIPTION OF THE DRAWINGS

FIG. 4 is a format diagram illustrating an example of a simplified cellular telephone network conversion table according to this embodiment.

FIG. 5 is a format diagram illustrating an example of a cellular telephone network conversion table according to this embodiment.

FIG. 6 is a format diagram illustrating an example of a mobile packet communication network conversion table according to this embodiment.

FIG. 7 is a format diagram illustrating an example of a latitude and longitude receiver list table according to this embodiment.

FIG. 11 is a format diagram illustrating an example of an area ID conversion table according to this embodiment.

FIG. 12 is a format diagram illustrating an example of a sector ID conversion table according to this embodiment.

FIG. 13 is a format diagram illustrating an example of a location information precision table according to this embodiment.

FIG. 16 is a format diagram illustrating an example of HTML-format sub-menu data which the IP server transmits to a mobile station, according to this embodiment.

FIG. 17 is a diagram of a screen displayed at the mobile station based on the HTML-format sub-menu data shown in FIG. 11, according to this embodiment.

FIG. 19 is a format diagram illustrating an example of the storage contents of an IP information database provided in the gateway server according to this embodiment.

FIG. 20 is a format diagram illustrating an example of the storage contents of a region code table provided in the gateway server according to this embodiment.

FIG. 21 is a format diagram illustrating an example of the storage contents of a positional relation information database provided in the IP server according to this embodiment.

FIGS. 22A and 22B constitute a flowchart illustrating the flow of operations in a mobile communication system in a first specific example of this embodiment.

FIG. 23 is a format diagram illustrating an example of the storage contents of an in-zone information table provided in an exchange station according to this embodiment.

FIG. 24 is a format diagram illustrating an example of the storage contents of a position registration database within a home memory according to this embodiment.

FIG. 25 is a format diagram illustrating an example of the storage contents of an ID database provided in the gateway server according to this embodiment.

FIGS. 26A and 26B constitute a flowchart illustrating the flow of operation of the mobile communication system according to a second specific example according to this embodiment.

FIG. 28 is a format diagram illustrating an example of the storage contents of the database provided in the gateway server according to this embodiment.

FIG. 29 is a format diagram illustrating an example of the storage contents of a database provided in the gateway server according to this embodiment.

BEST MODE FOR CARRYING OUT THE INVENTION

Embodiments of the present invention will be described with reference to the drawings.

In the following, a description will be given for the following three embodiments.

First embodiment: An embodiment wherein a mobile communication terminal can notify of location information to a computer, even in the event that the representational format of location information differs between the mobile communication terminal and the computer;

Second embodiment: An embodiment wherein a mobile communication terminal notifies to a computer of location information at a precision desired by the computer; and Third embodiment: An embodiment wherein a mobile communication terminal notifies to various servers of location information as a standard interface protocol, while maintaining security of the location information of the mobile communication terminal.

Note, however, that these first through third embodiments are no more than examples, and that the present invention can take on various embodiments within the scope of the technical concept thereof.

A: First Embodiment

With the first embodiment of the present invention, an embodiment will be described wherein a mobile communication terminal can notify location information to a computer, even in the event that the representational format of the location information differs between the mobile communication terminal and the computer.

A-1: Configuration of the First Embodiment

First, the configuration of the first embodiment will be described.

(1) Overall Configuration of the Network

Figure 1:
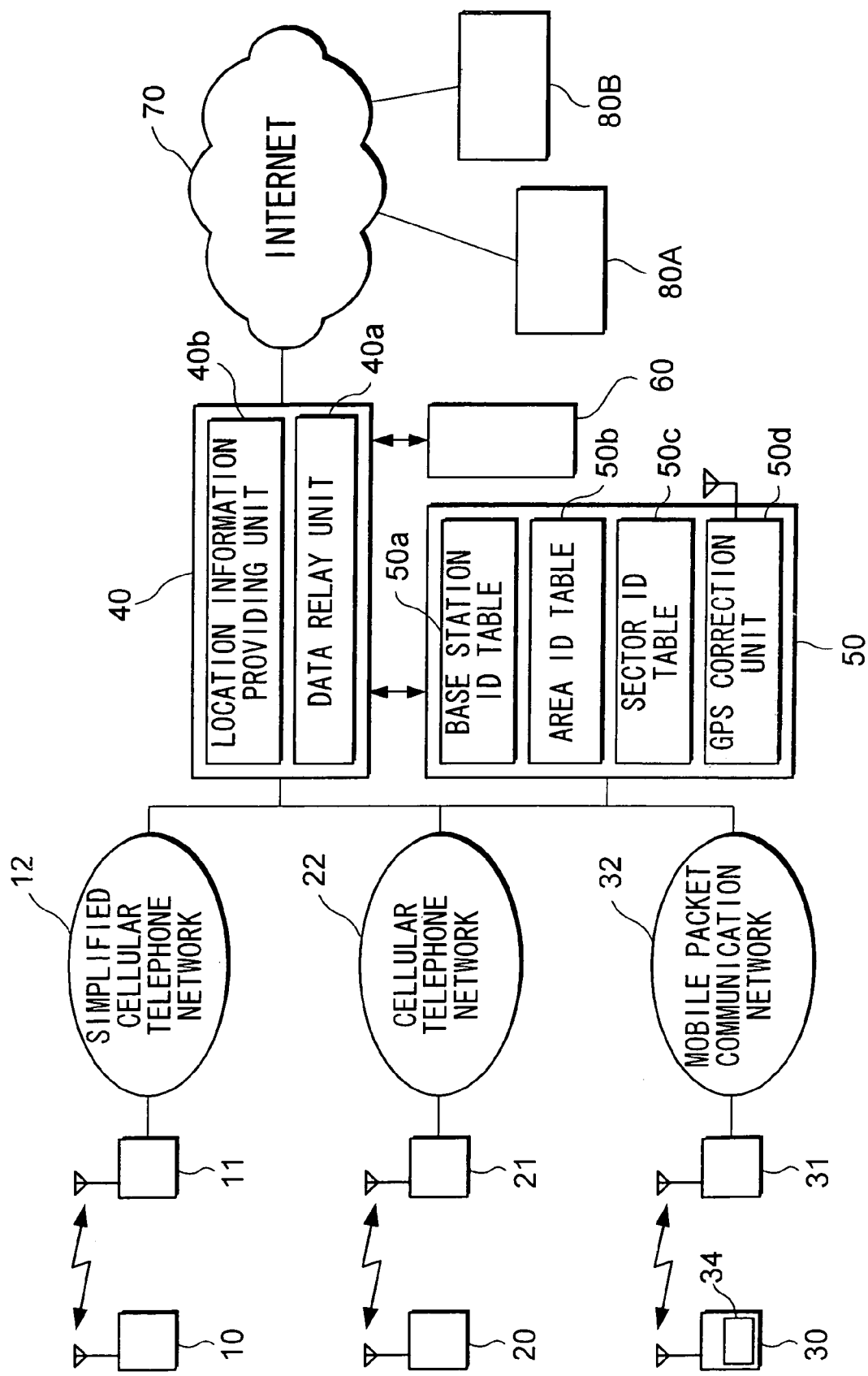
FIG. 1 is a block diagram illustrating the configuration of the overall network for executing the location information notifying method according to a first embodiment of the present invention.

FIG. 1 is a block diagram illustrating the overall configuration of a network relating to the embodiment. In this figure, reference numeral 10 denotes a simplified cellular telephone (mobile communication terminal) served by a simplified cellular telephone network 12 (mobile communication network) called a PHS (Personal Handy-phone System). The simplified cellular telephone 10 can receive PHS telephone communication services by performing-wireless communication with a base station 11 of the simplified cellular telephone network 12.

Reference numeral 20 denotes a cellular telephone (mobile communication terminal) served by a cellular telephone network 22 (mobile communication network) such as a PDC (Personal Digital Cellular) network. The cellular telephone 20 can receive cellular telephone services such as the PDC service by performing wireless communication with a base station 21 of the cellular telephone network 22. The above simplified cellular telephone network 12 and cellular telephone network 22 are connected by a gateway device not shown here, so that call connections can be made between them.

Reference numeral 30 denotes a cellular telephone (mobile communication terminal) served by a mobile packet communication network 32 (mobile communication network). The cellular telephone 30 can receive packet communication services by performing wireless communication with a base station 31 of the mobile packet communication network 32. The cellular telephone 30 is provided with a GPS receiver 34, and is capable of performing measurements to obtain location information representing latitude and longitude. In the following description, in cases where the above simplified cellular telephone 10, cellular telephone 20, and cellular telephone 30 are to be collectively referred to, these will be referred to as cellular telephones 10, 20, and 30.

Reference numeral 40 denotes a gateway server, which relays data communications between the mobile packet communication network 32 and the Internet 70 or other external networks. This gateway server 40 is provided with a data relay unit 40a for handling the above data communication relaying and a location information providing unit 40b (first location information notifying unit) for notifying location information of the above-described cellular telephones 10, 20, and 30 to computers such as IP (Information Provider) servers 80A, 80B, etc., connected to the Internet 70. This location information providing unit 40b is provided with a latitude and longitude receiver list table which is described herein below.

Reference numeral 50 denotes a pos tion measurement center (first location information generating unit), which obtains and stores location information for the cellular telephones 10, 20, and 30. For example, the simplified cellular telephone network 12 is arranged so as to be able to determine wireless zone of the base station 11 in which each simplified cellular telephone 10 currently exists. The position measurement-center 50 obtains the determination results from the simplified cellular telephone network 12, correlates the identification information of each simplified cellular telephone 10 and the identification information of the base station 11 (i.e., base station ID) by which the cellular telephone is served, and stores the correlated information in a base station ID table 50a.

The cellular telephone network 22 is arranged so as to be able to determine service area in which each cellular telephone 20 currently exists. A service area is a region which includes a predetermined number of wireless zones of the base station 21. The position measurement center 50 obtains the determination results from the cellular telephone network 22, correlates the identification information of each cellular telephone 20 and the identification information of the service area (i.e., area ID) in which the cellular telephone is currently located and stores the correlated information in an area ID table 50b.

The mobile packet communication network 32 is arranged so as to be able to determine sector of the wireless zones of the base station 31 in which each cellular telephone 30 currently exists. The wireless-zone of the base station 31 is divided into partial regions by the directional antennas of the base station and each partial region is called as a sector. The position measurement center 50 obtains the determination-results from the mobile packet: communication network 32, correlates the identification information of each cellular telephone 30 and the identification information of the sector (i.e., sector ID) in which the cellular telephone exists, and stores the correlated information in a sector ID table 50c.

Further, the position measurement center 50 is provided with a GPS correction unit 50d for performing correction processing on the measurement values of the cellular telephone 30 by the D (differential)-GPS method. The GPS correction unit 50d obtains GPS measurement values of the cellular telephone 30 via the mobile packet communication network 32, and corrects the obtained GPS measurement values based on the GPS measurement margin of error held within itself. The latitude and longitude information as a result of the correction is stored in a latitude and longitude table (not shown) within the GPS correction unit 50d, in such a manner so as to be correlated with the identification information of the cellular telephones 30.

As described above, according to the present embodiment, the location information of the cellular telephones 10, 20, and 30 is obtained from the networks 12, 22, and 32, in representational formats which are all different from each other.

Reference numeral 60 denotes a location information converting device (first location information representation converting unit) which performs conversion of the location information. This location information converting device 60 converts the location information of the cellular telephones 10, 20, and 30 obtained from the networks 12, 22, and 32 with differing representational formats into location information with a representational format which can be handled by the computers such as the IP servers 80A, 80B, etc., connected to the Internet 70, based on a location information conversion table described herein below. Due to this location information converting device 60, the computers requesting location information can receive supply of location information of the cellular telephones 10, 20, and 30, without taking the difference in representational format into consideration.

The IP servers 80A and 80B which have obtained location information provide position-related information relating to the location information to the cellular telephones 10, 20, and 30.

(2) Configuration of the Cellular Telephones

Next, the configuration of the cellular telephones 10, 20, and 30, will be described.

Figure 2:
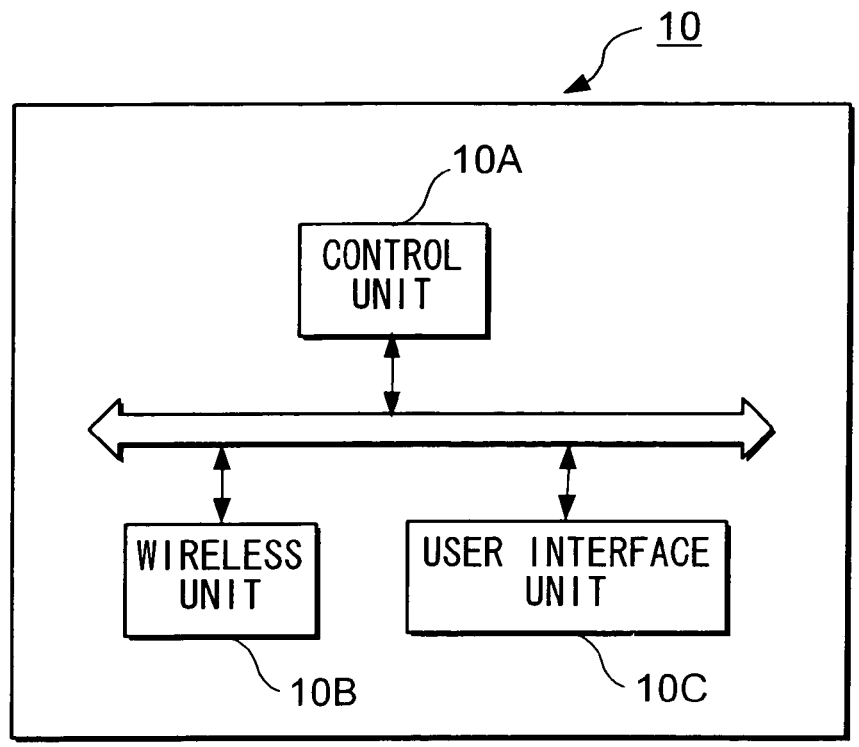
FIG. 2 is a block-diagram illustrating the configuration of a simplified cellular telephone according to this embodiment.

FIG. 2 is a block diagram illustrating the configuration of the simplified cellular telephone 10. In the figure, the simplified cellular telephone 10 comprises a control unit 10A, a wireless unit 10B, and a user interface unit 10C, which are mutually connected by a bus.

The control unit 10A is made up of a CPU, memory, etc., and controls each of the units of the simplified cellular telephone 10. The wireless unit 10B performs wireless communication of audio signals and various types of control signals with the base station 11, thereby enabling wireless calls. The user interface unit 10C is made up of a microphone and speaker for providing audio input and output for calls, an operating panel for dialing operations, a liquid crystal display unit, and so forth.

The configuration of the cellular telephone 20 is the same as the configuration shown in FIG. 2, so description thereof will be omitted.

Figure 3:
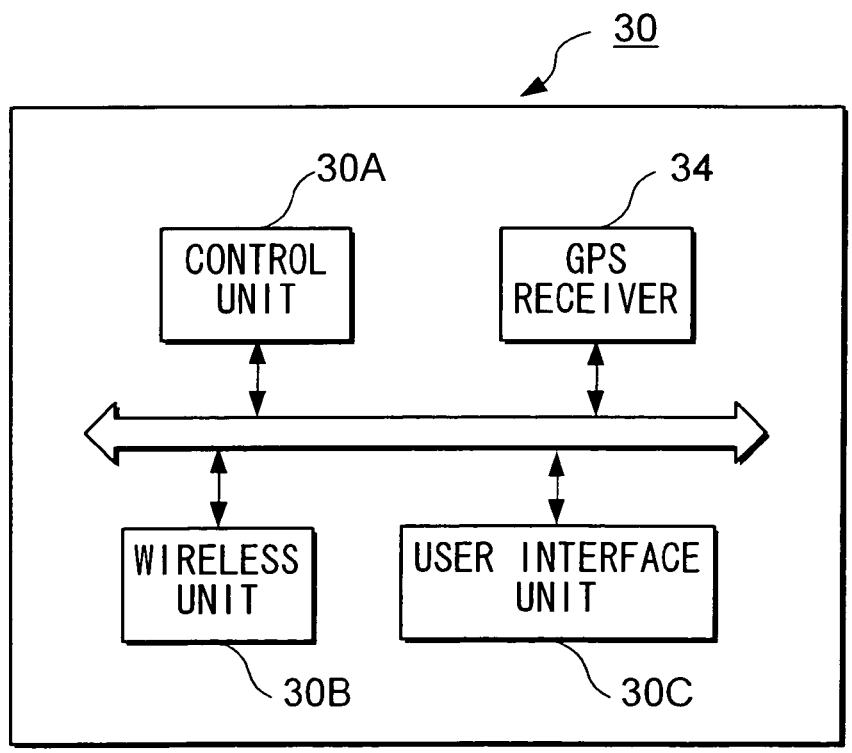
FIG. 3 is a block diagram illustrating the configuration of a cellular telephone provided with a GPS receiver, according to this embodiment.

FIG. 3 is a block diagram illustrating the configuration of the cellular telephone 30. In the figure, the cellular telephone 30 comprises a control unit 30A, a wireless unit 30B, a user interface unit 30C, and a GPS receiver 34, mutually connected by a bus.

This cellular telephone 30 differs from the other cellular telephones 10 and 20 in that what, is sent by wireless communication is not so-called voice calls, but packet data communication, and in that a GPS receiver 34 is provided. The GPS receiver 34 measures latitude and longitude which indicates the position of the cellular telephone 30, based on signals received from a satellite (not shown). The measured values of the latitude and longitude are transmitted by the wireless unit 30B, sent to the position measurement center 50 via the mobile packet communication network 32 as described above, and subjected to D-GPS correction.

(3) Configuration of the Location Information Conversion Table

Next, various types of location information conversion tables provided in the location information converting device 60 will be described with reference to FIG. 4 through FIG. 6.

FIG. 4 is a format diagram illustrating an example of a simplified cellular telephone network conversion table. As shown in the figure, the conversion table holds in a correlated manner the base station ID which is used as location information in the simplified cellular telephone network 12 and information such as latitude and longitude (X, Y) or administrative district (1-1-1, Toranomon, Minato-ku) and the like, which can be handled as location information by computers such as the IP servers 80A and 80B and the like.

FIG. 5 is a format diagram illustrating an example of a cellular telephone network conversion table. As shown in the figure, the conversion table holds in a correlated manner the area ID which is used as location information in the cellular telephone network 22 and information such as latitude and longitude (X, Y) or administrative district (1-1-1, Toranomon, Minato-ku) and the like, which can be handled as location information by computers such as the IP servers 80A and 80B and the like.

FIG. 6 is a format diagram illustrating an example of a mobile-packet communication network conversion table. As shown in the figure, the conversion table holds in a correlated manner the sector ID which is used as location information in the mobile packet communication network 32 and information such as latitude and longitude (X, Y) or administrative district (1-1-1, Toranomon, Minato-ku) and the like, which can be handled as location information by computers such as the IP servers 80A and 80B and the like.

(4) Configuration of Latitude and Longitude Receiver List Table

Next, the configuration of the latitude and longitude receiver list table provided in the location information providing unit 40b of the gateway server 40 will be described with reference to FIG. 7.

FIG. 7 is a format diagram illustrating an example of a latitude and longitude receiver list table. As shown in the figure, the latitude and longitude receiver list table holds a list of computers which can handle latitude and longitude as location information. In this example, they are the IP servers 80A, 80F, 80K . . . . Though not shown in FIG. 1, each of the IP servers 80F and 80K are computers connected to the Internet 70.

In the event of providing location information to computers listed in this latitude and longitude receiver list table, the location information providing unit 40b supplies the latitude and longitude information obtained by making reference to the latitude and longitude table (not shown) within the GPS correction unit 50d as is to the computer which requested it, without passing through the location information converting device 60.

A-2: Operation of the First Embodiment

Next, the operation of the embodiment with the above-described configuration will be described.

Figure 8:
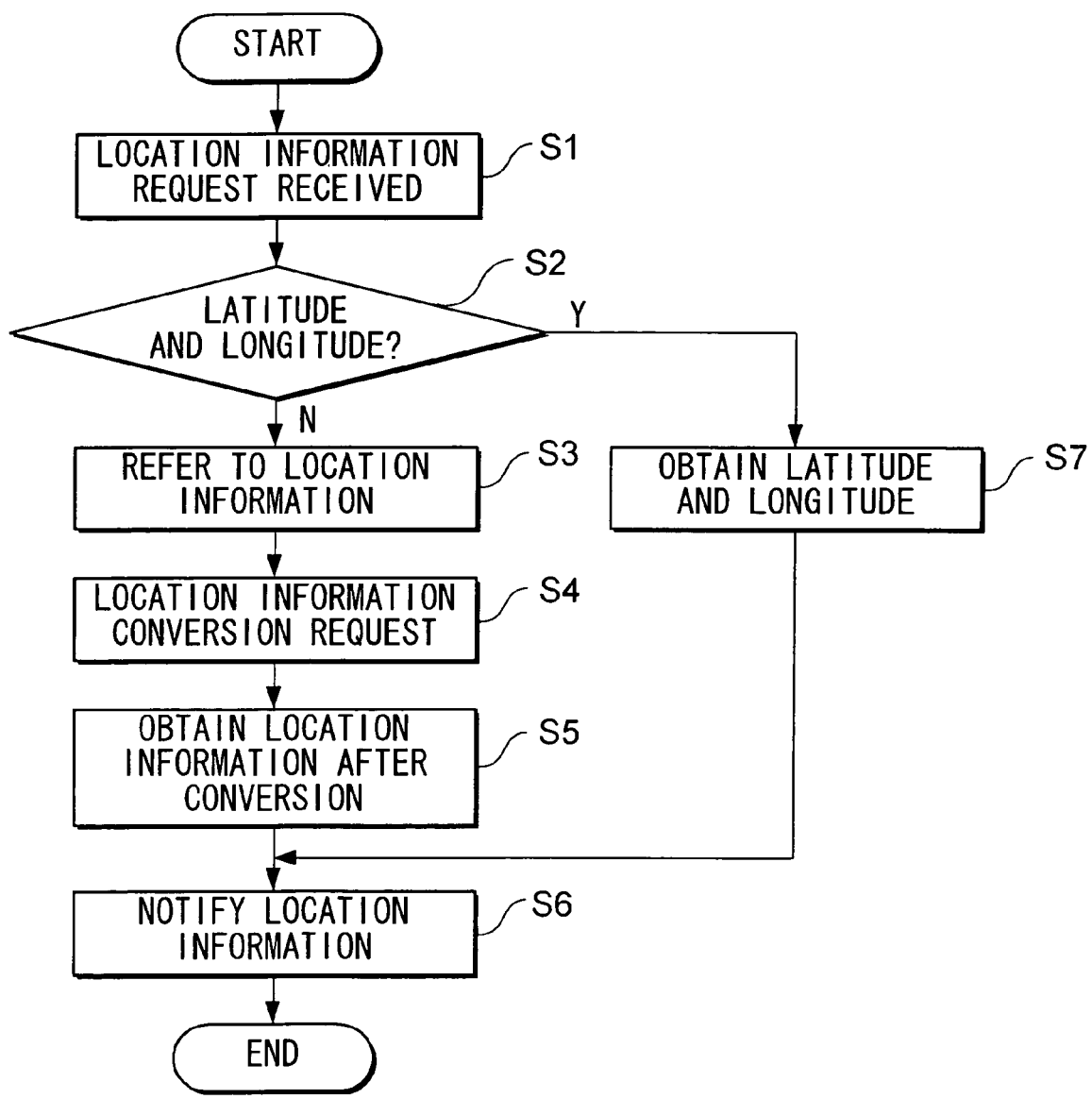
FIG. 8 is a flowchart illustrating the operation of the location information providing unit of a gateway server according to this embodiment.

FIG. 8 is a flowchart illustrating the operation of the location information providing unit 40b of the gateway server 40. With reference to this flowchart, the following is a description of operations according to an example of notifying the location information of the cellular telephone 30 to the IP server 80B.

First, upon a request signal requesting the location information of the cellular telephone 30 being transmitted from the IP server 80B to the gateway server 40, the processing of the location information providing unit 40b proceeds to step S1. At step S1, the location information providing unit 40b receives the above request signal via the data relay unit 40a. Contained in this request signal is identification information of the IP server 80B which is the requester of the location information and identification information of the cellular telephone 30 regarding which location information is being requested, and the location information providing unit 40b detects these pieces of identification information from the request signal.

Next, the processing of the location information providing unit 40b proceeds to step S2. In step S2, the location information providing unit 40b locates information regarding the IP server 80B among the latitude and longitude receiver list table shown in FIG. 7 using the identification information of the IP server 80B contained in the request signal as a search key, and determines whether or not this IP server 80B is on the latitude and longitude receiver list. In the example shown in FIG. 7, the IP server 80B is not on the list, so the result of the determination is "No".

Next, the processing of the location information providing unit 40b proceeds to step S3. In step S3, the location information providing unit 40b specifies the identification information of the cellular telephone 30, and makes a request to the position measurement center 50 for the location information of the cellular telephone 30. Upon receiving this request, the position measurement center 50 locates information regarding the specified the cellular telephone 30 among the sector ID table 50c using the identification information of the telephone as a search key, reads out the sector ID which is the location information of the cellular telephone 30, and provides this to the location information providing unit 40b. Thus, the location information providing unit 40b obtains the sector ID as the location information of the cellular telephone 30.

Next, the processing of the location information providing unit 40b proceeds to step S4. In step S4, the location information providing unit 40b specifies the obtained sector ID and the identification information of the IP server 80B, and orders the location information converting device 60 to convert the location information. Upon receiving this orders, the location information converting device 60 makes reference to the mobile packet communication network conversion table shown in FIG. 6, with the specified sector ID and the identification information of the IP server 80B as a search key. Thus, the location information converting device 60 reads out from the mobile packet communication network conversion table the location information corresponding to the sector ID of the administrative district in the representational format which the IP server 80B is capable of handling, and supplies this to the location information providing unit 40b.

Next, the processing of the location information providing unit 40b proceeds to step S5. In step S5, the location information providing unit 40b obtains the location information of the cellular telephone 30, which has been converted into the administrative district representational format, from the location information converting device 60.

Next, the processing of the location information providing unit 40*b* proceeds to step S6. In step S6, the location information providing unit 40*b* sends the obtained location information of the cellular telephone 30 out onto the Internet 70, with the identification information of the IP server 80B specified as the destination address.

Thus, the IP server 80B can obtain the location information of the cellular telephone 30 in an administrative district representational format which can be handled by the server 80B.

On the other hand, in the above example, in the event that notification of the location information of the cellular telephone 30 is to be made to the IP server 80A for example, the IP server 80A is registered in the latitude and longitude receiver list table shown in FIG. 7, so the result of the determination at step S2 is "Yes". In this case, the processing of the location information providing unit 40*b* proceeds to step S7. In step S7, the location information providing unit 40*b* specifies the identification information of the cellular telephone 30, and requests the latitude and longitude information of the cellular telephone 30 from the GPS correction unit 50*d* of the position measurement center 50. Upon receiving this request, the GPS correction unit 50*d* makes reference to the above latitude and longitude table with the identification information of the specified cellular telephone 30 as a search key, and reads out the latitude and longitude information as the location information of the cellular telephone 30. Then the latitude and longitude information is supplied to the location information providing unit 40*b*. Upon obtaining the latitude and longitude information as the location information of the cellular telephone 30, the location information providing unit 40*b* proceeds to step S6, and transmits the obtained latitude and longitude information to the IP server 80A.

Also, though operation examples have been described wherein the location information of the cellular telephone 30 is notified to the IP servers 80B or 80A, the basic operation is the same in cases wherein the requester of the location information is another computer, or in cases wherein the cellular device the location information of which is requested belongs to another network, with only the tables to which reference is made changing to those corresponding to identification information of these. However, in the event that there is a request from a computer which handles provision of latitude and longitude, for location information (latitude and longitude information) specifying the identification information of a cellular device not provided with a GPS receiver, the latitude and longitude information of this cellular device cannot be obtained even by making reference to the above latitude and longitude table. In this case, latitude and longitude information cannot be provided, and an error notification is made the requesting computer, to that effect.

Thus, according to the first embodiment of the present invention, the computers can obtain location information without taking differences in representational formats into consideration, even in cases wherein the representational formats of location information differ according to cellular devices belonging to different networks and further even in cases wherein the representational formats which the computers requesting the location information of the cellular devices can handle differ. That is to say, according to this first embodiment, it can be said that a common platform for location information notification can be provided.

A-3: Modifications of First Embodiment

As already mentioned, the present invention is not restricted to the above embodiment; rather, various modifications may be made. For example, the following modification may be made with the first embodiment.

(1) Arrangement of the Network

The arrangement of the network is not restricted to that shown in FIG. 1. For example, the mobile communication networks which are connected are not restricted to the networks 12, 22, and 32; rather, any of these may be omitted, or alternately, other communication networks may be further connected.

For example, the above-described cellular telephone network 32 may be a fixed communication network, and the cellular telephone 30 may be a fixed communication terminal or a portable communication terminal connected to the fixed communication network.

Also, with regard to networks to which computers such as the IP servers or the like are connected, the network is not restricted to the Internet; rather, intranets, dedicated lines, or other networks may serve.

Further, the form of nodes on the network are not restricted to the gateway server 40, position measurement center 50, and location information converting device 60, shown in FIG. 1; rather, which functions to assign to which node is determined arbitrarily. For example, all of the functions of these nodes 40 through 60 may be handled by the gateway server 40, or the location information providing unit 40*b* may be configured as a separate node. Also, an arrangement may be made wherein the position measurement center 50 notifies the location information of the cellular telephones 10 through 30 to the cellular telephones 10 through 30, with the cellular telephones 10 through 30 themselves functioning as the location information providing unit 40*b* of the gateway server 40, and the location information converting device 60.

(2) Notification of Latitude and Longitude Information

With the first embodiment, in the event that there is a request from a computer which is to be provided with latitude and longitude, for location information (latitude and longitude information) of cellular telephones 10, 20, and 30 which are not provided with GPS receivers, an error notification is made to the requesting computer, that latitude and longitude information cannot be provided.

However, the invention is not restricted to such an arrangement; rather, an arrangement may be made wherein in the event that latitude and longitude information cannot be obtained by GPS, the location information providing unit 40*b* provides to the computer latitude and longitude information obtained by making reference to the tables 50*a* through 50*c*.

Figure 9:
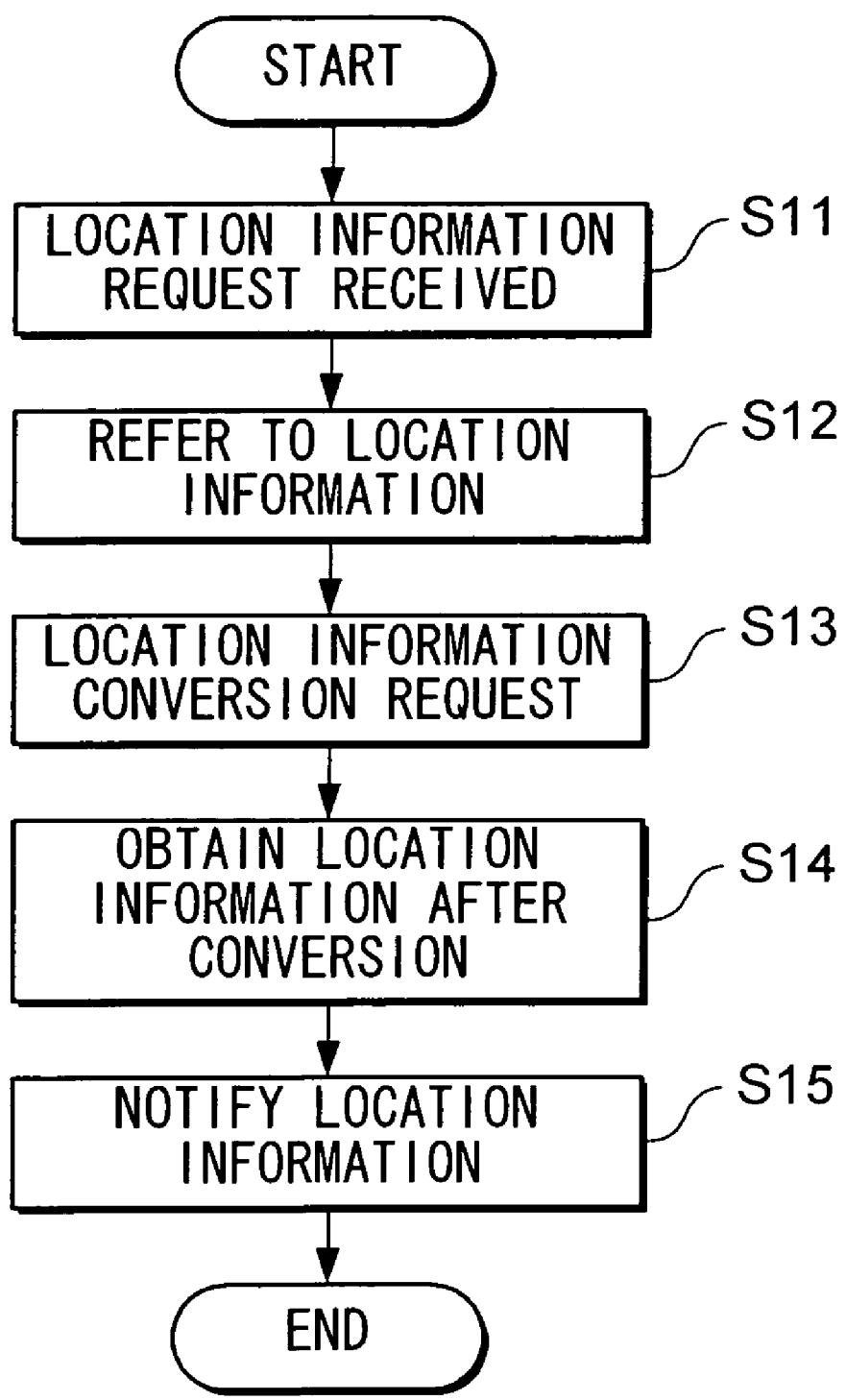
FIG. 9 is a flowchart illustrating the operation of the location information providing unit of a gateway server according to a variation of this embodiment.

FIG. 9 is a flowchart illustrating the operation of the location information providing unit 40*b* of the gateway server 40 in such an arrangement. With reference to this flowchart, the following is a description of the operation, according to an example in which the location information of a cellular telephone 20 which is not provided with a GPS receiver is notified, to the IP server 80A which can handle location information in the latitude and longitude representational format.

First, upon a request signal requesting location information of the cellular telephone 20 being transmitted from the IP server 80A to the gateway server 40, the processing of the location information providing unit 40*b* proceeds to step S11. In step S11, the location information providing unit 40*b* receives the above request signal via the data relay unit 40*a*.

Contained in this request signal is the identification information of the IP server 80A which is the requester of the location information and identification information of the cellular telephone 20 regarding which location information is being requested, and the location information providing unit 40b detects these pieces of identification information from the request signal.

Next, the processing of the location information providing unit 40b proceeds to step S12. In step S12, the location information providing unit 40b specifically indicates the identification information of the cellular telephone 20, and requests location information for the cellular telephone 20 from the position measuring center 50. Upon receiving this request, the position measuring center 50 makes reference to the area ID table 50b with the identification information of the specifically indicated cellular telephone 20 as a search key, reads out the area ID as the location information of the cellular telephone 20, and supplies this to the location information providing unit 40b. Thus, the location information providing unit 40b obtains the area ID as the location information of the cellular telephone 20.

Next, the processing of the location information providing unit 40b proceeds to step S13. In step S13, the location information providing unit 40b specifically indicates the obtained area ID and the identification information of the IP server 80A, and orders the location information converting device 60 to convert the location information. Upon receiving this order, the location information converting device 60 makes reference to the cellular telephone network conversion table shown in FIG. 5, with the specifically indicated area ID and the identification information of the IP server 80A as a search key. Thus, the location information converting device 60 reads out the latitude and longitude location information corresponding to the area ID which is the representational format which the IP server 80A is capable of handling, and supplies this to the location information providing unit 40b.

Next, the processing of the location information providing unit 40b proceeds to step S14. In step S14, the location information providing unit 40b obtains from the location information converting device 60 the location information of the cellular telephone 20 which has been converted into the latitude and longitude representational format.

Next, the processing of the location information providing unit 40b proceeds to step S15. In step S15, the location information providing unit 40b sends the obtained location information of the cellular telephone 20 out onto the Internet 70, with the identification information of the IP server 80A specified as the destination address.

Thus, the IP server 80A can obtain the location information of the cellular telephone 20 which is not provided with a GPS receiver, in a latitude and longitude representational format which it is capable of handling.

(3) Arrangement for Operation of Location Information Notification

With the first embodiment, the arrangement was such that location information notification is performed in response to location information requests from the side of computers such as the IP servers 80A and 80B, but the invention is not restricted to this; rather, an arrangement may be made wherein, for example, the gateway server 40 notifies location information to the IP servers 80A and 80B in response to a notification request from a cellular device, or wherein the gateway server 40 arbitrarily notifies location information to the IP servers 80A and 80B.

(4) Receiver of Location Information Notification

With the first embodiment, the example is a case in which notifying the location information of the cellular devices 10, 20, and 30, is notified to computers such as IP servers connected to networks outside the networks 12, 22, and 32, but the invention is not restricted to such; rather, an arrangement may be made wherein, instead of the location information of the cellular devices being notified to the cellular devices 10, 20, and 30 themselves, the location information thereof is notified to other cellular devices. Further, notification may be made to predetermined nodes within the networks 12, 22, and 32, instead of the cellular devices 10, 20, and 30. That is to say, the terminology "predetermined computer" within the scope of the claims is a concept encompassing these cellular devices and nodes within the networks.

B: Second Embodiment

Next, as a second embodiment of the present invention, an arrangement wherein notification is made of location information at a precision desired by a computer is given. The present embodiment will be described with an example wherein the location information of the cellular telephone 30 (mobile communication terminal) contained in the mobile packet communication network 32 (mobile communication network) according to the first embodiment is notified to a computer.

B-1: Configuration of Second Embodiment (1) First, the Configuration of the Second Embodiment will be Described.

Figure 10:
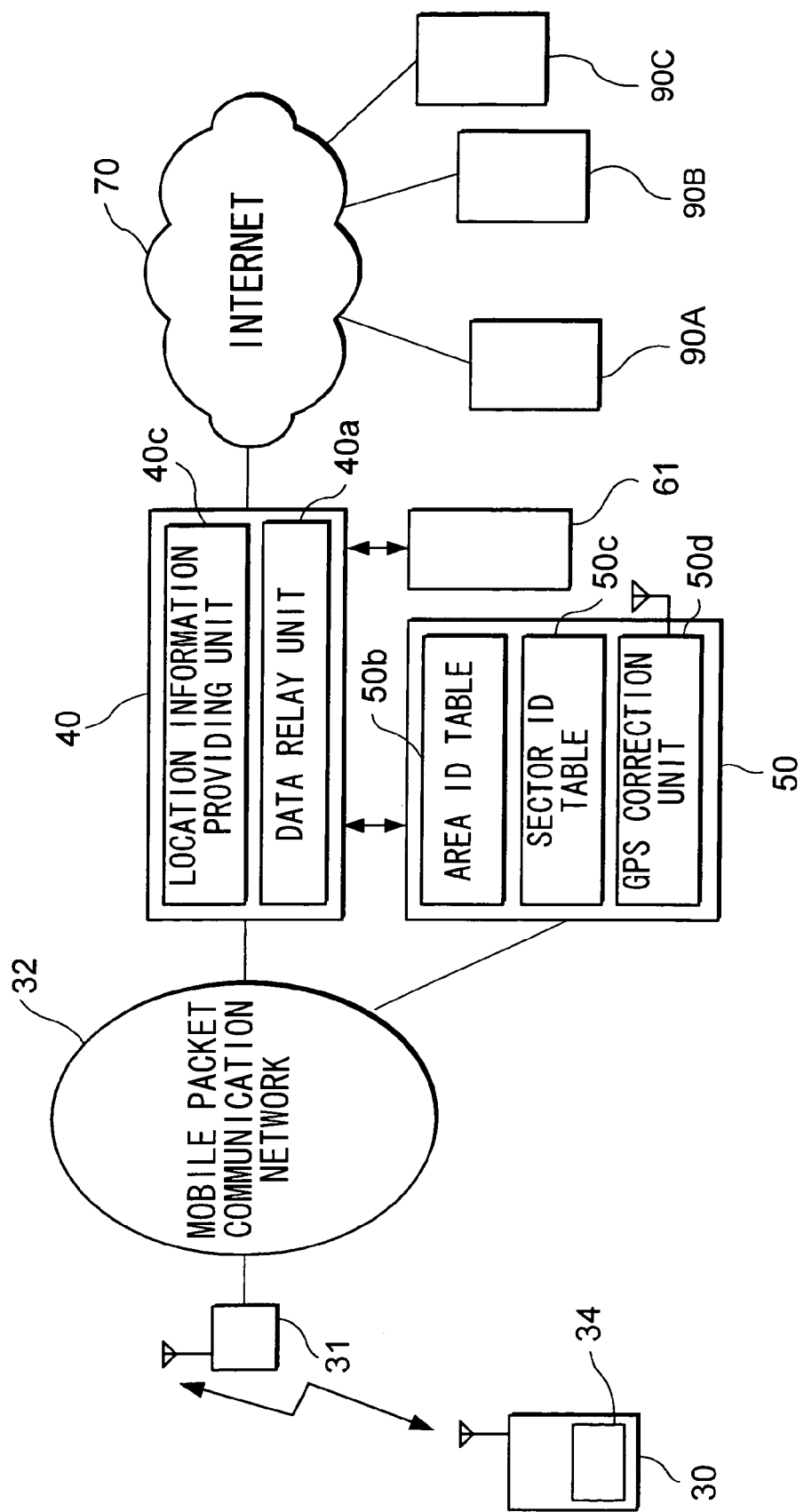
FIG. 10 is a block diagram illustrating the configuration of the overall network for executing the location information notifying method according to a second embodiment of the present invention.

FIG. 10 is a block diagram illustrating the overall configuration of a network relating to the second embodiment. In this figure, the configurations which are the same as those in the above-described first embodiment will be denoted with the same reference numerals, and the description thereof will be omitted. The second embodiment differs from the first embodiment with regard to the functions of the position measurement center 51 (second location information generating unit), location information converting device 61 (second location information representation converting unit), and location information providing unit 40c (second location information notifying unit), and description will be made below accordingly.

As described above, the position measurement center 51 correlates the identification information of the cellular telephone 30 and the sector ID of the service area where the cellular telephone 30 exists, and stores this in the sector ID table 50c. Further, the position measurement center 51 obtains the area ID of the service area where the cellular telephone 30 exists, and correlates the identification information of the cellular telephone 30 with the area ID of the service area where the cellular telephone 30 exists, and stores the correlation in the area ID table 50b. Obtaining of this area ID is performed by correlating each sector ID and area ID of service areas containing the sector IDs beforehand.

The location information converting device 61 converts the location information of the cellular telephone 30 into location information with a precision desired by the computers of IP servers 90A through 90C connected to the Internet, based on the location information conversion table described herein below. Due to the location information converting device 61, each computer requesting obtaining of location information can receive location information of the cellular telephone 30, without taking into consideration differences in precision with which it desires.

Then, the IP servers 90A through 90C, upon having obtained location information, provide the position related information-relating to the location information to the cellular telephone 30.

(2) Configuration of Location Information Conversion Table

Next, the various types of location information conversion tables provided in the location information converting device 61 will be described with reference to FIG. 11 and FIG. 12.

FIG. 11 is a format diagram illustrating an example of a low-precision conversion table. As shown in the figure, the low-precision conversion table holds, in a correlated manner, the area ID (e.g., AREA001), and the region name of the service area indicated by the area ID (e.g., East Tokyo).

FIG. 12 is a format diagram illustrating an example of a medium-precision conversion table. As shown in the figure, the conversion table holds, in a correlated manner, the sector ID (e.g., SEC001), and the region name of the sector which the sector ID indicates (e.g., 1 Chome, Toranomon, Minato-ku, Tokyo).

(3) Configuration of the Location Information Providing Unit 40c

Next, with reference to FIG. 13, the configuration of the location information precision table provided in the location information providing unit 40c of the gateway server 40 will be described.

FIG. 13 is a format diagram illustrating an example of the location information precision table. As shown in the figure, the location information precision table holds information relating to the precision of the location information required by the computers such as the IP servers 90A, 90B, 90C, and so forth.

In this example, the IP server 90A is a server which performs, for example, route navigation serves to a destination point for the user or position tracking services, and accordingly requires high-precision location information with a margin of error around 10 meters. This high-precision location information is equivalent to the location information obtained by the GPS receiver 34 provided in the cellular telephone 30.

The IP server 90B is a server which provides, for example, town information for the area of town where the user is, and accordingly requires medium-precision location information with a margin of error of around several hundred meters. This medium-precision location information is equivalent to the location information based on the sector ID of the sector where the cellular telephone 30 exists.

The IP server 90C is a server which, for example, provides weather forecast information for the region where the user is, and accordingly only needs to obtain low-precision location information with a margin of error of around several kilometers to several tens of kilometers. This low-precision location information is equivalent to the location information based on the area ID of the service area where the cellular telephone 30 exists.

In the event that location information is to be provided to a computer listed in this location information precision table, the location information providing unit 40c specifies one of the precisions, high-precision through low-precision, held in a manner correlated with the computer, and orders the location information converting device 61 to perform location information conversion.

B-2: Operation of Second Embodiment

Next, the operation of the second embodiment with the above-described configuration will be described.

Figure 14:
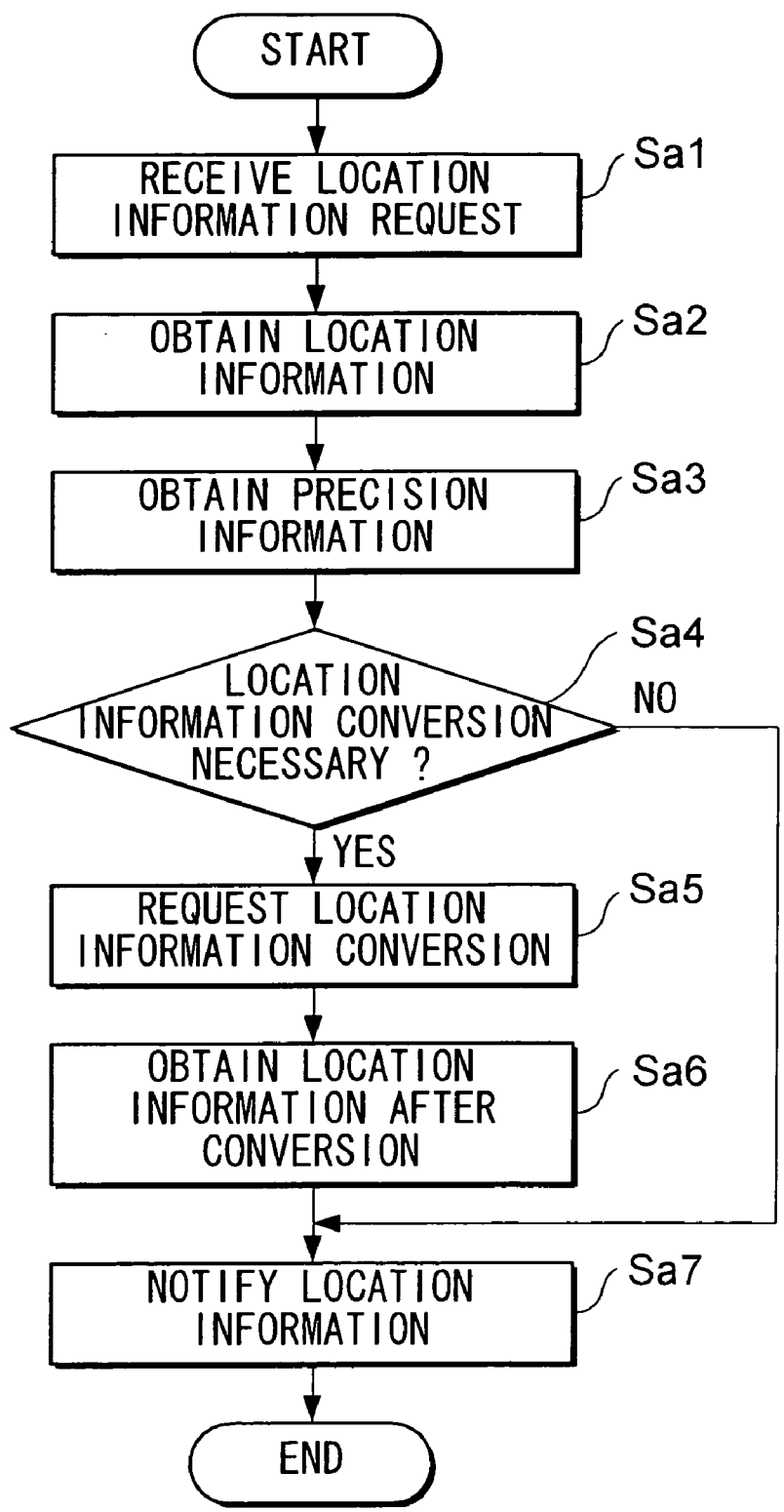
FIG. 14 is a flowchart illustrating the operation of the location information providing unit of a gateway server according to this embodiment.

FIG. 14 is a flowchart illustration the operation of the location information providing unit 40c of the gateway server 40. With reference to this flowchart, the following is a description of the operation, according to an example of the location information providing unit 40c notifying the location information of the cellular telephone 30 to the IP server 90A.

First, upon a request signal requesting the location information of the cellular telephone 30 being transmitted from the IP server 90A to the gateway server 40, the processing of the location information providing unit 40c proceeds to step Sa1. At step Sa1, the location information providing unit 40c receives the above request signal via the data relay unit 40a. Contained in this request signal is the identification information of the IP server 90A which is the requester of the location information and identification information of the cellular telephone 30 regarding which location information is being requested, and the location information providing unit 40c detects these pieces of identification information from out of the request signal.

Next, the processing of the location information providing-unit 40c proceeds to step Sa2. In step Sa2, the location information providing unit 40c specifies the identification information of the cellular telephone 30, and makes a request to the position measurement center 51 for the location information of the cellular telephone 30. Upon receiving this request, the position measurement center 51 makes reference to the sector ID table 50c with the identification information of the specified cellular telephone 30 as a search key, and reads out the sector ID which as location information of the cellular telephone 30. Then, this sector ID is supplied to the location information providing unit 40c. Thus, the location information providing unit 40c obtains the sector ID as the location information of the cellular telephone 30.

Next, the processing of the location information providing unit 40c proceeds to step Sa3. In step Sa3, the location information providing unit 40c makes reference to the location information precision table shown as an example in FIG. 13 with the identification information of the IP server 90A contained in the request signal as a search key, thereby obtaining the precision of the location information required by the IP server 90A.

Next, the processing of the location information providing unit 40c proceeds to step Sa4. In step Sa4, the location information providing unit 40c makes reference to the precision of the location information obtained in step Sa2 and the precision of the location information obtained in step Sa3, and determines whether or not conversion of location information is necessary. Specifically, in the event that the precision of the location information of the cellular telephone 30 obtained from the position measurement center 51 is the same precision or a higher precision than that needed by the IP server 90A, a determination is made that there is no need to convert the location information. On the other hand, in the event that the precision of the location information of the cellular telephone 30 obtained from the position measurement center 51 is the a lower precision than that needed by the IP server 90A, determination is made that it is necessary to convert the location information.

Here, while the precision of the location information of the cellular telephone 30 obtained from the position measurement center 51 is medium-precision, the precision needed by the IP server 90A is high-precision, so determination is made that conversion of location information is necessary, and the flow proceeds along "Yes".

Next, the processing of the location information providing unit 40c proceeds to step Sa5. In step Sa5, the location information providing unit 40c specifies the identification information of the cellular telephone 30 and the precision of location information needed by the IP server 90A (high-precision), and orders the location information converting device 61 to convert the location information. Upon receiving this order, the location information converting device 61 specifies the identification information of the cellular telephone 30 and requests high-precision location information (latitude and longitude information) of the cellular telephone 30 from the GPS correction unit 50d of the position measurement center 51. Upon receiving this request, the GPS correction unit 50d makes reference to the latitude and longitude table (not shown) with the identification information of the specified cellular telephone 30 as a search key, thereby reading out the latitude and longitude information which is the location information of the cellular telephone 30. Then, the latitude and longitude information is supplied from the position measurement center 51 to the location information converting device 61.

Next, the processing of the location information providing unit 40c proceeds to step Sa6. In step Sa6, the location-information providing unit 40c obtains the high-precision location information from the location information converting device 61.

Further, the processing of the location information providing unit 40c proceeds to step Sa7, sends the high-precision location information of the cellular telephone 30 out onto the Internet 70, with the identification information of the IP server 90A specified as the destination address.

Thus, the IP server 90A can obtain location information of the cellular telephone 30 at the precision which it needs.

On the other hand, in the above example, in the event for example of notifying the location information of the cellular telephone 30 to the IP server 90B, the precision of the location information obtained from the position measurement center 51 in step Sa2 matches the precision of the location information required by the IP server 90B, so the result of the determination in step Sa4 is "No". In this case, the processing of the location information providing unit 40c proceeds to step Sa7, and sends the location information of the cellular telephone 30 obtained from the position measurement center 51 to the IP server 90B, without change.

Thus, according to the second embodiment of the present invention, even in the event that the precision of the location information needed by the computers differs, the computers can obtain location information without taking into consideration such difference in precision, thereby allowing a common platform for location information notification to be provided.

B-3: Modifications of Second Embodiment

As already mentioned, the present invention is not restricted to the above second embodiment; rather, various modifications may be made. For example, the following modification may be made with the second embodiment.

(1) Arrangement of the Network

The arrangement of the network is not restricted to that shown in FIG. 10.

For example, the above-described cellular telephone network 32 may be a fixed communication network, and the cellular telephone 30 may be a fixed communication terminal or a portable communication terminal connected to the fixed communication network.

Also, with regard to networks to which computers such as IP servers or the like are connected, the network is not restricted to the Internet; rather, intranets, dedicated lines, or other networks may serve.

(2) Arrangement of Nodes on Network

Further, the arrangement of nodes on the network are not restricted to the cellular telephone 30, gateway server 40, position measurement center 51, and location information converting device 61, as with the second embodiment; rather, which functions to assign to which node is determined arbitrarily. For example, all of the functions of the nodes 40, 51, and 61 may be handled by the gateway server 40, or a location information providing unit 40c may be configured as a separate node.

Also, an arrangement may be made wherein the cellular telephone 30 functions as the location information providing unit 40c of the gateway server 40, and the location information converting device 61. This arrangement will be described below.

In addition to the GPS receiver 34, the cellular telephone 30 is provided with a location information receiving unit (not shown). This location information receiving unit requests transmission of location information of itself to the mobile packet communication network 32, and is provided with functions for receiving location information transmitted from the network 32. The location information transmitted from the network 32 is location information of medium-precision based on the sector ID or low-precision based on the area ID.

First, the cellular telephone 30 transmits a request signal requesting a route navigation service to the IP server 90A. In response to this request signal, the IP server 90A notifies the precision of the location information which it needs (e.g., high-precision location information) to the cellular telephone 30.

In response to this notification, the cellular telephone 30 obtains its own location information. The default operation of this location information obtaining is to obtain the location information with high-precision of latitude and longitude by the cellular telephone 30 instructing the GPS receiver 34.

Next, the cellular telephone 30 converts the location information based on the precision notified from the IP server 90A. Here, the notified precision is high-precision of latitude and longitude, so the location information obtained from the GPS receiver 34 is notified to the IP server 90A without converting the latitude and longitude location information.

On the other hand, in the above example, in the event that the cellular telephone 30 requests a weather forecast from the IP server 90C, the precision of the location information specified by the IP server 90C is low-precision, so the cellular telephone 30 sends a request to the mobile packet communication network 32 and obtains low-precision location information, which is transmitted to the IP server 90C.

(3) Arrangement for Operation of Location Information Notification

With the second embodiment, the arrangement was such that location information notification is performed in response to location information requests from the side of computers such as the IP servers 90A through 90C and so forth, but the invention is not restricted to this; rather, an arrangement may be made wherein, for example, notification is made in response to notification requests from the cellular telephone 30, or wherein the gateway server 40 arbitrarily notifies.

(4) Location Information Notification Receiver

With the second embodiment, the example is a case wherein the location information of the cellular telephone 30 is notified to computers such as IP servers 90A through 90C and the like connected to networks outside the mobile packet communication network 32, but the invention is not restricted to such; rather, an arrangement may be made wherein the location information of the cellular telephone 30 is notified to another cellular telephone (not shown). Further, notification may be made to predetermined nodes within the mobile packet communication network 32, rather than to another cellular telephone. That is to say, the terminology "predetermined computer" within the scope of the claims is a concept encompassing these other cellular telephones and nodes within the mobile packet communication network 32.

C: Third Embodiment

Next, with the third embodiment of the present invention, an arrangement will be described wherein the location information is notified to various servers as a standard interface protocol, while maintaining security of the location information of the mobile communication terminal.

As for specific examples of this third embodiment, there are 1: a first specific example wherein location information is notified to the server along with data signals transmitted from a mobile station; and 2: a second specific example wherein location information is notified to the server in response to requests from the server; these will now be described in order.

C-1: First Specific Example

C-1-1 Configuration of First Specific Example

First, the configuration of the first specific example will be described.

(1) Configuration of the Overall System

Figure 15:
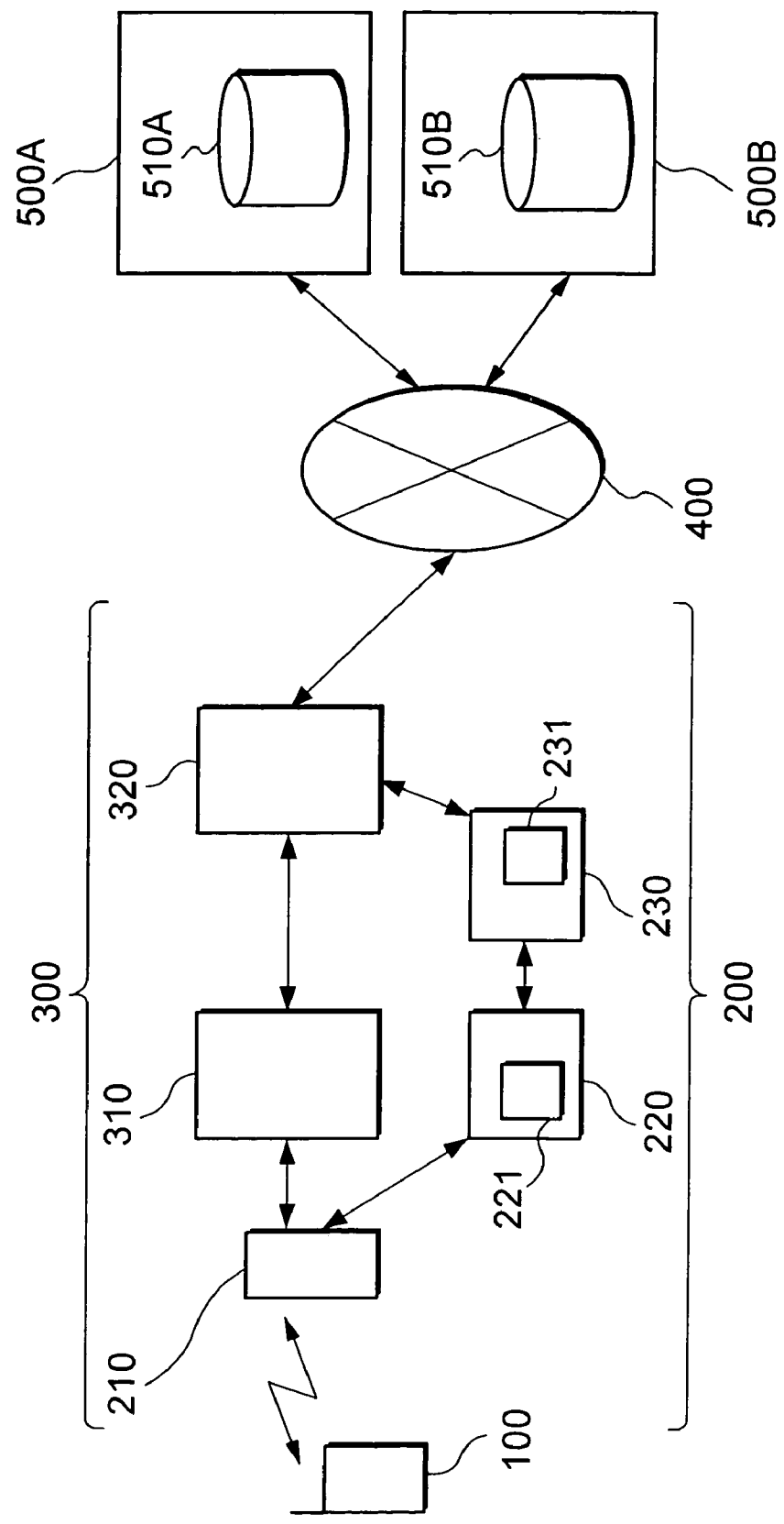
FIG. 15 is a block diagram illustrating the configuration of the overall mobile communication system for executing the location information notifying method according to a third embodiment of the present invention.

FIG. 15 is a block diagram illustrating the configuration of the overall mobile communication system relating to the first specific example.

This mobile communication system comprises a mobile station 100, mobile telephone network 200, mobile packet communication network 300, Internet 400, IP servers 500A, 500B, and so forth. In this first specific example, the above mobile packet communication network 300 and mobile telephone network 200 will be collectively referred to as a mobile communication network.

The mobile station 100 (mobile communication terminal) is a mobile communication terminal such as a cellular telephone or a PHS, and receives call services of the mobile telephone network 200 and packet communication services of the mobile packet communication network 300. The mobile station 100 comprises an audio input/output unit for allowing the user to make voice calls, a wireless unit for performing wireless communication with the base station of the mobile communication network, an information display unit configured of a liquid crystal panel or the like, an operating unit where information input operations such as numerical input and character input and the like is performed, and a built-in micro-computer for controlling each unit.

Also, the mobile station 100 is provided with document data viewing software (a so-called browser), so as to display an interactive screen based on HTML (HyperText Markup Language) format data (hereafter referred to as HTML data) supplied from an information provider (hereafter abbreviated as IP) via the mobile packet communication network 300.

The mobile telephone network 200 (mobile communication network) is a communication network for providing communication services to the mobile station 100, and the mobile station 100 can receive call services via this mobile telephone network 200, or via the network 200 and a fixed telephone network (not shown).

The mobile telephone network 200 is configured of a base station 210, exchange station 220, home memory 230, and communication lines and the like connecting these.

A large number of the base stations 210 are set up within the call service area at predetermined intervals, and a base station ID is provided for each base station 210. The base stations 210 perform wireless communication with the mobile stations 100 existing within the various wireless zones. The exchange station 220 contains multiple base stations 210, and performs exchanging processing of the communication lines of the mobile stations 100 existing within the wireless zones of the base stations. This exchange station 220 has an in-zone information table 221 for obtaining the mobile stations 100 existing within the wireless zones of the base stations 210 which it contains.

The home memory 230 has registered therein various information such as subscriber information, position registration information, billing information, etc., as a database. The position registration information is information indicating the areas within the network to which the mobile stations 100 belong, and this is stored in the position registration database 231.

The mobile packet communication network 300 is a communication network for providing packet communication services to the mobile station 100; and is configured of the above base station 210, exchange station 220, home memory 230, etc., and further packet subscriber processing devices 310, gateway server 320, and communication lines connecting these. The packet subscriber processing devices 310 are computer systems included in the above exchange station 220 regarding the device configuration thereof, and each has a unique packet subscriber processing device ID. The packet subscriber processing devices 310 receive packet exchange requests from the mobile stations 100, confirm the validity of the received packet exchange requests, and perform processing for relaying the packet exchange, and so forth.

The gateway server 320 is a computer system provided in a mobile packet gateway relay exchange station (not shown) for mutual connection of the mobile packet communication network 300 with other networks such as the Internet 400 and the like, and intermediates data exchange between networks while converting differing communication protocols between the multiple networks. Specifically, the gateway server 320 performs mutual conversion between the transfer protocol of the mobile packet communication network 300 and TCP/IP which is the standard communication protocol of the Internet 400.

Further, the gateway server 320 holds main menu screen data for showing menus for the various services provided to the users of the mobile stations 100 by the IP servers 500A, 500B, . . . and so forth, and the data is transmitted to a mobile station 100 in response to a request from the mobile station 100. This main menu screen data is HTML format data, and URLs including the host names of the IP servers 500A, 500B, . . . for executing the services corresponding to the menu items, are embedded in the main menu items.

Further, the gateway server 320 further is provided with functions for generating location information indicating the position of the mobile station 100. With the present embodiment, the gateway server 320 generates location information of the mobile station 100 by analyzing inbound signals transmitted from the mobile station 100 to the IP servers 500A, 500B, . . . Also, location information can be generated using the above-described in-zone information table 221 or the position registration database 231, but such techniques will not be used with this first specific example; these techniques will be used with a second specific example described herein below. The configuration of the gateway server 320 and details of the location information generating operations thereof will be described later.

The IP servers 500A, 500B, . . . are server systems run by the IPs, and send information out onto the Internet 400, to be provided to the users as HTML format data. In this first specific example, the IP servers 500A, 500B, . . . are servers for providing to the mobile station 100 position related information according to the position of the mobile station 100, and are provided with position related information databases 510A, 510B, . . . which store various types of position related information. The IP servers 500A, 500B, . . . search the position related information databases 510A, 510B, . . . based on the location information of the mobile station 100 notified from the gateway server 320, and transmit the position related information obtained as a result of the search to the mobile station 100 via the Internet 400 or the like.

Further, the IP servers 500A, 500B, store HTML format sub-menu screen data for showing the user menus for services which it performs, and when the mobile station 100 accesses the IP servers 500A; 500B, . . . the stored sub-menu screens are transmitted to the mobile station 100.

Now, a description regarding the configuration of HTML data, which is the sub-menu screen data, will be given.

FIG. 16 is a diagram illustrating an example of HTML format sub-menu screen data which the IP servers 500A, 500B, . . . transmit to the mobile station 100, and FIG. 17 is a diagram of the sub-menu screen displayed on the mobile station 100 based on the screen data.

As shown in FIG. 17, sub-menu items include, for example, "restaurant information", "movie theater information", "museum information", "registration of tracking information provision", and so forth.

Of these sub-menu items, "restaurant information", "movie theater information", and "museum information" are for providing restaurant information and the like to the user of the mobile station 100, according to the location information of the mobile station 100. Each sub-menu item has a corresponding hypertext link text string embedded therein.

For example, in the event that the user selects "Restaurant information" from the sub-menu screen shown in FIG. 17, the hypertext link text string "http://xxx.co.jp/cgibin/restaurant.cgi?area=NULLAREA" (see FIG. 16) which is embedded in "restaurant information" is transmitted from the mobile station 100 to one of the IP servers 500A, 500B, . . . indicated by the host name "xxx.co.jp", via the gateway server 320 and the like.

A predetermined data string "NULLAREA" is included at the end of the hypertext link text string, and this data string " NULLAREA" will be substituted with the location information of the mobile station 100 at the gateway server 320 and transmitted to the IP servers 500A, 500B, . . . indicated by the host name, and hereafter will be referred to as "location information substituting data string".

Now, the service contents of "Registration of tracking information provision" shown in FIG. 16 and the hypertext link text string "http://xxx.co.jp/cgi-bin/pushregist.cgi?uid=NULLID" embedded therein will be described in the second specific example described herein below.

(2) Configuration of Gateway Server 320

Next, the configuration of the gateway server 320 will be described.

Figure 18:
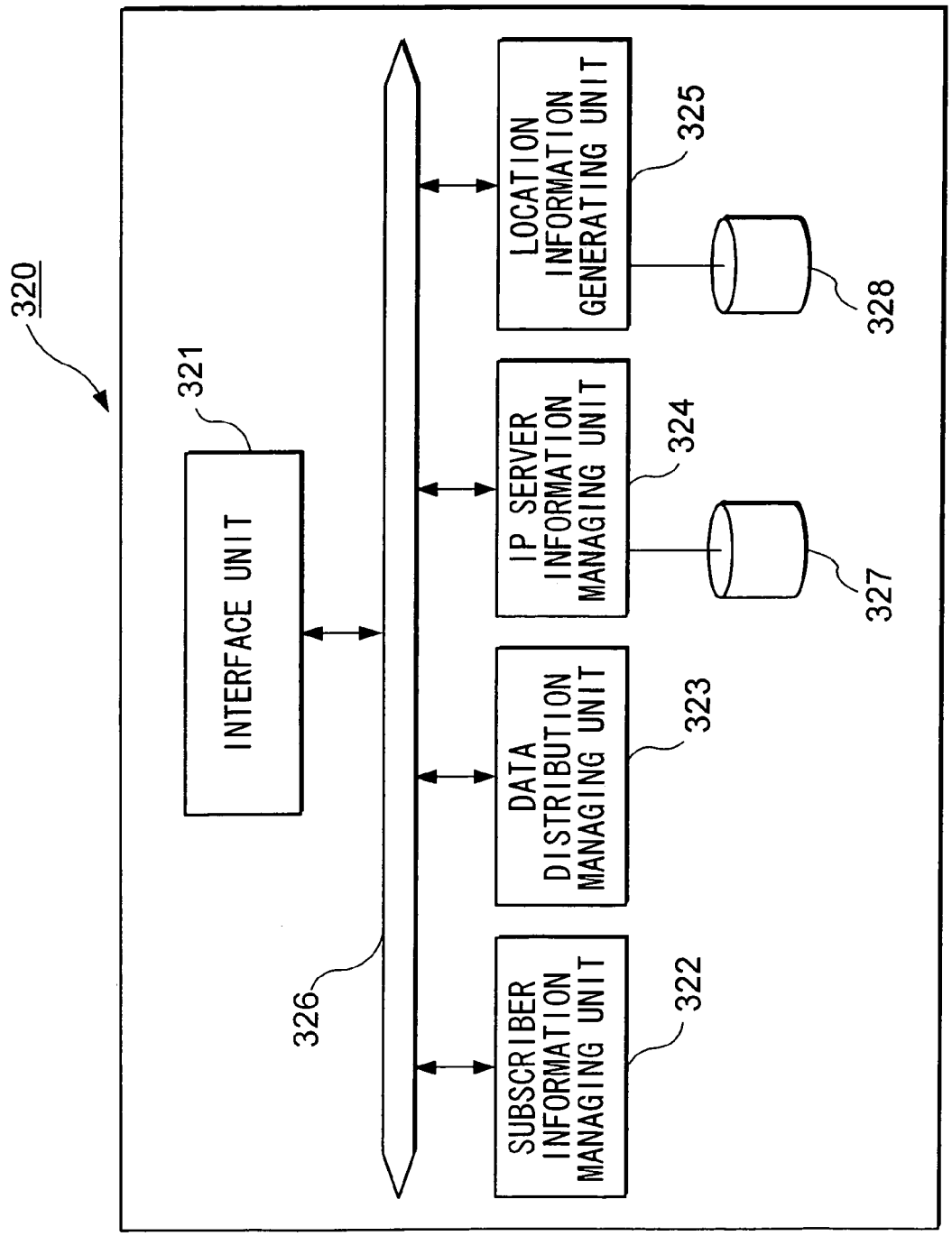
FIG. 18 is a block diagram illustrating the configuration of a gateway server according to this embodiment.

FIG. 18 is a block diagram illustrating the configuration of the gateway server 320.

The gateway server 320 is made up of an interface unit 321 (receiving unit and transmitting unit), subscriber information managing unit 322, data distribution managing unit 323 (third location information notifying unit, receiving unit, transmitting unit, detecting unit, substituting unit, notification permission/non-permission determining unit, inquiry unit, determining unit, and error signal transmitting unit), IP server information managing unit 324 (disclosure information storing unit), location information generating unit 325 (third location information generating unit), and a bus 326 and the like mutually connecting these.

The interface unit 321 functions as an interface between networks, such as performing protocol conversion between other networks such as the mobile packet communication network 300 and the Internet 400.

The subscriber information managing unit 322 stores and manages subscriber information which is obtained by making reference to the above-described home memory 230.

The data distribution managing unit 323 manages data distribution processing between mobile stations 100, between a mobile station 100 and another network such as the Internet 400, or between a mobile station 100 and the IP servers 500A, 500B, . . . and the like, and also; functions to substitute a predetermined data string detected in data transmitted from the mobile station 100 with location information of the mobile station 100, as described later. Further, the data distribution managing unit 323 stores the above-described main menu screen data, and transmits the screen data to the mobile station 100 in response to request signals from the mobile station 100. In addition to "position related information services" for providing position related information relating to the position of the mobile station 100, the main menu items also include a "news distribution service" which performs news distribution, and so forth.

Now, there are two methods for the mobile station 100 to access the IP servers 500A, 500B, . . . ,: a method for the user to select a desired main menu item from the main menu screen displayed on the mobile station 100, and a method for the user to use the keypad of the mobile station 100 to directly input the URL of the desired IP servers 500A, 500B, . . .

First, in the event of the user selecting a main menu item from the main menu screen displayed on the mobile station 100, the arrangement is such that, upon the mobile station 100 transmitting a request signal containing a URL embedded in that main menu item to the gateway server 320, the data distribution managing unit 323 of the gateway server 320 accesses one of the IP servers 500A, 500B, . . . based on the host name of the URL contained in the received request signal.

Also, in the event of the user directly inputting the URL of the IP servers 500A, 500B, . . . which the user desires to access to the mobile station 100, the arrangement is such that, upon the mobile station 100 transmitting a request-signal containing the input URL to the gateway server 320, the data distribution managing unit 323 of the gateway server 320 accesses one of the IP servers 500A, 500B, . . . based on the host name of the URL contained in the received request signal.

Once the mobile station 100 accesses one of the IP servers 500A, 500B, . . . by one of the above methods, the IP server 500A, 500B, . . . transmits a stored sub-menu screen to the mobile station 100, as described above.

The IP server information managing unit 324 is provided with an IP information database 327 which stores information relating to the IP servers 500A, 500B, . . . and performs registration, updating, etc., of this information. The above data distribution managing unit 323 makes reference to this IP information database 327, and transmits the location information of the mobile station 100 to the IP servers 500A, 500B, . . . . The configuration of this IP information database 327 will be described later.

The location information generating unit 325 generates location information of the mobile station 100 as described below.

Inbound signals transmitted from the mobile station 100 to the IP servers 500A, 500B, . . . contain for example, URLs for the IP servers 500A, 500B, . . . which are the destinations of the signals, the mobile station ID of the originating mobile station 100, and so forth. Further, in the process of the inbound signals being relayed by the devices within the mobile communication network, the ID of each device is added to the signal. That is to say, following transmission of this inbound signal from the mobile station 100, reception at the base station 210 adds the base station ID of the base station, and further, reception at the packet subscriber processing device 310 adds the packet subscriber processing device ID of the packet subscriber processing device 310.

Accordingly, when the inbound signal transmitted from the mobile station 100 is received by the gateway server 320, the signal contains the URL of one of the destination IP servers 500A, 500B, . . . , the mobile station ID, a base station ID, and a packet subscriber processing device ID. The location information generating unit 325 can determine in which base station 210 wireless zone which mobile station 100 exists, by analyzing the ID information and so forth.

The location information generating unit 325 is provided with, in a correlated manner, a region code table 328, storing base station IDs and region codes of regions where the base stations of the base station IDs are located. The location information generating unit 325 searches the region code table 328 with the base station ID of the zone where the mobile station 100 exists as a search key, and the region code obtained as the result thereof and the mobile station ID of the above mobile station 100 are taken as the location information of the mobile station 100.

(3) Configuration of IP Information Database 327

Next, the configuration of the IP information database 327 provided in the IP server information managing unit 324 will be described.

FIG. 19 shows a data format diagram of the IP information database 327.

As shown in the figure, for each "IP server name", information such as "host name", "service name", "location information disclosure flag", "user consent flag", and so forth, is stored in the IP information database 327 for each server.

The location information disclosure flag is set to ON regarding an IP server 500 for which the location information of the mobile station 100 is disclosed (i.e., an IP server 500 capable of obtaining the location information of the mobile station 100).

For example, in the figure, the IP server 500A and IP server 500B are IP servers for providing position related information providing services, and the IP server 500B is an IP server for performing wide-area information providing services.

Now, wide-area information means information which is not specific to a particular region, and wide-area information providing services are services providing wide-area information to the mobile station 100 which are not dependent on the location information of the mobile station 100. An example of wide-area information providing services is nationwide news distribution services and so forth. On the other hand, position related information providing services are services for providing information relating to a particular region based on the position of the mobile station 100, such as services for providing restaurant information and so forth, as described above.

Accordingly, as shown in the figure, the IP server 500A and the IP server 500B are IP servers capable of obtaining location information (i.e., the IP server 500A and IP server 500B receive disclosure of location information), so the location information disclosure flag is set to ON. On the other hand, the IP server 500C is a server which does not obtain location information of the mobile station 100 (i.e., the IP server 500C does not receive disclosure of location information), so the location information disclosure flag is set to OFF.

Of the IP servers 500 which are the object of disclosure of the location information of the mobile station 100, the user consent flag is set to ON regarding the IP servers 500 which need the consent of the user of the mobile station 100 when disclosing the location information.

There are cases wherein the user does not want his/her own location information to be known, and, in such cases, this user consent flag has been-provided in order to prevent the location information of the mobile station 100 from the disclosed to the IP servers 500A, 500B, . . . against the will of the user.

Accordingly, even with IP servers 500 which receive disclosure of location information, there are IP servers which can unconditionally (i.e., without the consent of the user) obtain location information of the mobile station 100 (the IP server 500B shown in the figure) and IP-servers which can obtain location information only with consent of the user (the IP server 500A shown in the figure).

Now, there is no flag information or the like to serve as such disclosure standards for IP servers 500 not registered in the IP information database 327, but the gateway server 320 determines that the location information disclosure flag is set to OFF for such IP servers 500 not registered in the IP information database 327 (i.e., not to receive disclosure of location information).

(4) Configuration of Region Code Table 328

Next, the region code table 328 in the location information generating unit 325 will be described.

FIG. 20 is a data format diagram for the region code table 328.

This region code table 328 stores in a corresponding manner a "base station ID" which can be obtained as information indicating position within the mobile communication network, and a "region code" which IP servers 500A, 500B, . . . set up outside the network can obtain as information indicating position.

For example, the base station ID group "BS001-BS005" shown in the figure is approximately equivalent to the area of 1-Chome, Shibuya-ku, Tokyo, and accordingly a region code "CODE001" indicating 1-Chome, Shibuya-ku, Tokyo, is stored corresponding to this base station group.

(5) Configuration of Position Related Information Database 510

Next, the configuration of the position related information databases 510A, 510B, ... provided in the IP servers 500A, 500B, ... will be described, with the position related information database 510A as an example.

FIG. 21 is a format diagram of the position related information database 510A.

This position related information database 510A stores a "region code" for each region, and "region name" and "position related information" corresponding to each region code.

Now various standards may be conceived for sectioning the regions, such as by administrative district such as town and city names, by postal code, by latitude and longitude, etc. In the figure, region code "CODE001" indicates "1-Chome, Shibuya-ku", which is an administrative district, and information such as "buildings" in "1-Chome, Shibuya-ku" like "restaurants", "movie theaters", "museums", and "addresses", "telephone numbers", "events", and so forth, are stored in the position related information database 510A.

C-1-2: Operation of the First Specific Example

Figure 22A:
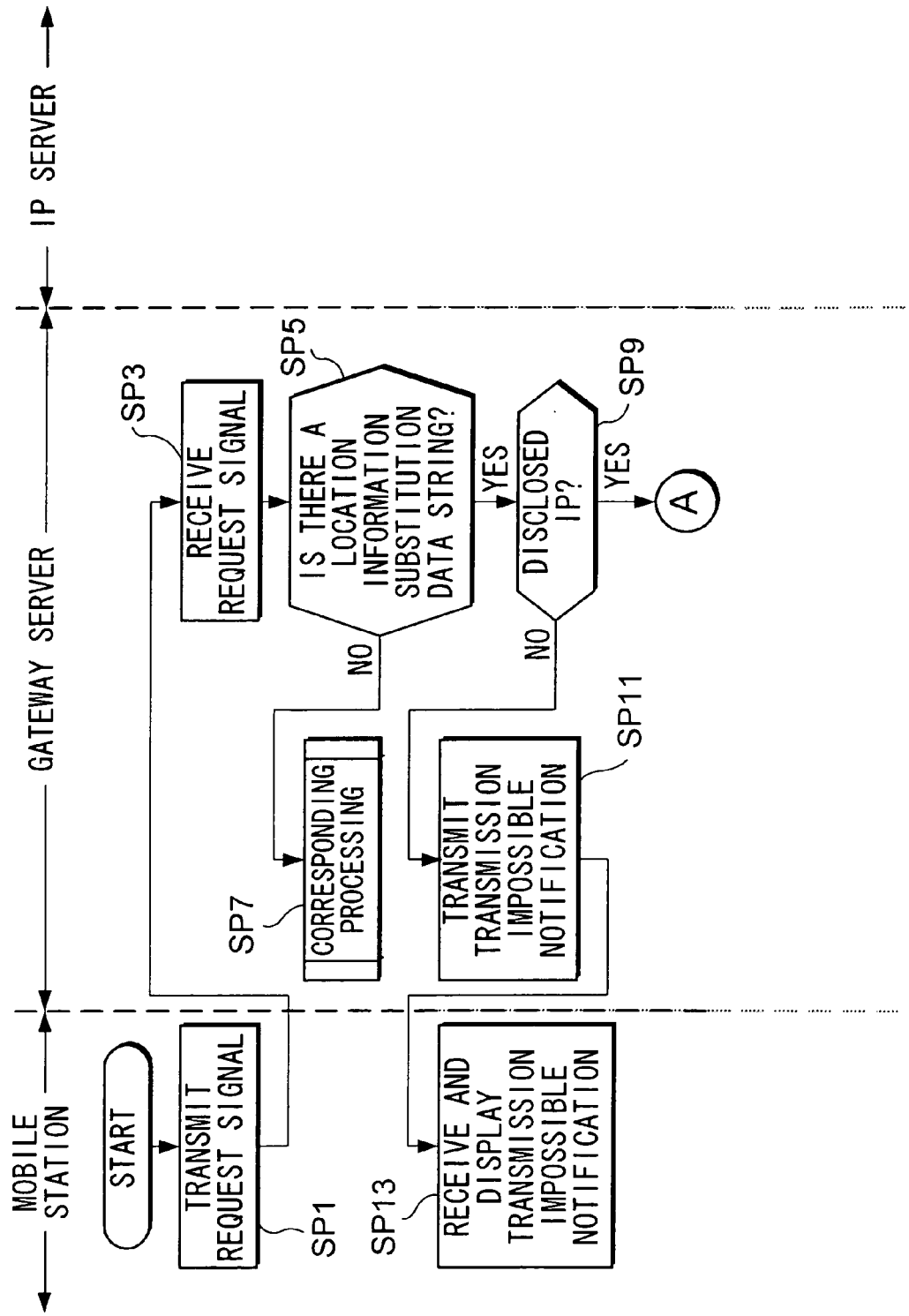

Next, the operation of the first specific example with the above configuration will be described with reference to the flowchart shown in FIGS. 22A and 22B.

First, the user selects a desired main menu item from the main menu screen displayed on the mobile station 100, or the user directly inputs the URL of a desired IP server 500A, 500B, ... to the mobile station 100, thereby accessing an IP server 500A, 500B, ... (here, the IP server 500A (host name: xxx.co.jp)). Next, the IP server 500A transmits the stored sub-menu screen data (e.g., the screen data illustrated in FIG. 16) to the mobile station 100 via the gateway server 320, and the mobile station 100 receives and displays this, thereby starting the processing shown in the figure.

Once the user selects a desired menu item from the sub-menu screen displayed on the mobile station 100 (e.g., "restaurant information" shown in FIG. 17), in step SP1, the mobile station 100 transmits to the gateway server 320 a request signal containing "http://xxx.co.jp/cgi-bin/restaurant.cgi?area=NULLAREA", which is embedded in the selected menu item.

In step SP3, the gateway server 320 receives the request signal via the base station 210 and the like.

In step SP5, the gateway server 320 determines whether or not the location information substitution data string "NULLAREA" is included in the hyperlink text string in the received request signal. In the event that the result of the determination is "No" (i.e., in the event that there is no location information substitution data string), the flow proceeds to step SP7, the gateway server 320 accesses one of the IP servers 500A, 500B, ..., based on the host name contained in the hyperlink text string in the received request signal, and subsequently performs data relay processing between the mobile station 100 and the IP servers 500A, 500B, ..., following the operations made by the user.

On the other hand, in the event that the result of the determination in step SP5 is "Yes" (i.e., in the event that there is a location information substitution data string), the flow proceeds to step SP9, the gateway server 320 makes reference to the host name contained in the hyperlink text string, and determines whether or not the IP server 500A indicated by the host name is to receive disclosure of location information. As described above, this determination is made by making reference to the setting state (ON or OFF) of the location information disclosure flag within the IP information database 327.

In the event that the result of the determination in step SP9 is OFF (i.e., in the event that the IP server 500A is not the object of disclosure of location information), the flow proceeds to step SP11, and the gateway server 320 transmits a transmission impossible notification to the mobile station 100 to the effect that location information cannot not be transmitted to the IP server 500A.

Then, in step SP13, the mobile station 100 receives the transmission impossible notification, and notifies this to the user by displaying it on the liquid crystal display.

On the other hand, in the event that the result of the determination in step SP9 is ON (i.e., in the event that the IP server 500A is to receive disclosure of location information), the flow proceeds to step SP15, and the gateway server 320 determines whether or not the consent of the user of the mobile station 100 is necessary when disclosing location information to the IP server 500A. As described above, this determination is made by making reference to the setting state (ON or OFF) of the user consent flag within the IP information database 327.

In the event that the result of the determination in step SP15 is OFF (i.e., in the event that user consent is unnecessary), the flow proceeds to step SP17.

On the other hand, in the event that the result of the determination in step SP15 is ON (i.e., in the event that user consent is necessary), the flow proceeds to step SP19, and the gateway server 320 transmits to the mobile station 100 input screen data for obtaining consent from the user for transmitting location information.

Then, in step SP21, the mobile station 100 receives and interprets the input screen data, and displays it on the liquid crystal display.

In step SP23, the mobile station 100 accepts input regarding permission/non-permission of consent from the user.

In step SP25, the mobile station 100 transmits the input information input by the user to the gateway server 320.

In step SP27, the gateway server 320 receives the input information.

Then, in step SP29, the input information relating to permission/non-permission of consent is interpreted, and determination is made regarding whether or not the location information may be transmitted to the IP server 500A.

In the event that the result of the determination is "No" (i.e., in the event that location information may not be transmitted to the IP server 500A), the flow proceeds to step SP31, and the gateway server 320 transmits a transmission impossible notification to the mobile station 100 to the effect that location information cannot be transmitted to the mobile station 100.

Then, in step SP33, the mobile station 100 receives the transmission impossible notification, and display this on the liquid crystal display. The user can view the display to confirm that location information was not transmitted.

On the other hand, in the event that the result of the determination in step S29 is "Yes" (i.e., in the event that location information may be transmitted to the IP server 500A), the flow proceeds to step SP17, and the gateway server 320 generates location information of the mobile station 100. That is, as described above, the gateway server 320 first extracts the base station ID contained in the request signal, searches the region code table 328 with the extracted base station ID as a search key, obtains the region code (which is "CODE001" here) corresponding to the base station ID, and uses the region code as the location information of the mobile station 100.

In step SP35, the gateway server 320 substitutes the location information substitution data string "NULLAREA" within the request signal with the location information "CODE001" of the mobile station 100, and transmits the hyperlink text string including the substituted location information, i.e., "http://xxx.co.jp/cgi-bin/restaurant.cgi?area=CODE001", as the request signal, to the IP server 500A based on the host name "xxx.co.jp".

In step SP39, the IP server 500A activates a position related information application in response to the received request signal. Then, position related information (restaurant information) corresponding to the location information (CODE001) received from the gateway server 320 is obtained from the position related information database 510A, and the above position related information is transmitted via the Internet 400 to the mobile station 100 based on the mobile station ID contained in the request signal.

Subsequently, the mobile station 100 receives and displays the position related information via the gateway server 320, thereby achieving the objective aim of the user at this time.

C-2: Second Specific Example

Next, as a second specific example of the third embodiment, an example will be described wherein location information of the mobile station 100 is notified to the IP servers 500A, 500B, . . . , in response to requests from the IP servers 500A, 500B, . . . .

C-2-1: Configuration of Second Specific Example

With the second specific example, as described above, location information of the mobile station 100 is generated using the in-zone information table 221 of the exchange station 220 and the position registration database 231 of the home memory 230. Accordingly, in the following, the configuration of the in-zone information table 221 and the position registration database 231 will be described in detail, and further, description will be made regarding how the second specific example differs from the first specific example. Incidentally, other configurations are the same as those of the first specific example, and accordingly description thereof will be omitted.

(1) Configuration of In-Zone Information Table 221 of Exchange Station 220

FIG. 23 is a format diagram illustrating an example of the stored contents of the in-zone information table 221.

As shown in the figure, the in-zone information table 221 stores a "base station ID" for each base station 210 contained in the exchange station 220, and a "mobile station ID" of the mobile station 100 used in a wireless zone of the base station 210 indicated by the base station ID (generally, the telephone No. of the mobile station 100 is used). Hereafter, information made up of the mobile station ID and base station ID will be referred to as in-zone information.

For example, this shows that there are three mobile stations 100 represented by the mobile station IDs "MS09-011111111", "MS09011111122", and "MS09011111130" existing in the wireless zone of the base station ID "BS001" shown in the figure. Also, there are no mobile stations 100 in the wireless zone of the base station ID "BS002", and there is one mobile station 100 represented by the mobile station ID "MS09011111140" existing in the wireless zone of the base station 210 of the base station ID "BS003".

When the mobile stations 100 move between the wireless zones of the base stations 210, processing for switching over to communication channels unique to each base station is performed between the mobile stations 100 and exchange stations 220 (a so-called hand-over), and the in-zone information of the above in-zone information table 221 are updated at the timing of this hand-over.

Each exchange station 220 makes reference to this in-zone information table 221 and manages communication processing between the base stations 210 and mobile stations 100.

(2) Configuration of the Position Registration Database 231 of the Home Memory 230

FIG. 24 is a format diagram illustrating an example of the stored contents of the position registration database 231.

Now, an area made up of the wireless zones of multiple base stations 210 contained in one exchange station 220 will be referred to as a "position registration area" (or general calling area). This position registration area is a unit of position registration of the mobile stations 100 performed within a mobile communication network, and the exchange station 220 performs general calling of the mobile stations 100 in units thereof. Also, each position registration area is provided with a position registration area ID.

As shown in the figure, the position registration database 231 stores each "mobile station ID" and the "position registration area ID" of the position registration areas where each mobile station exists, in an associated manner. Information made up of this "mobile station ID" and "position registration area ID" will be called position registration information.

For example, in the figure, this shows that the mobile station 100 represented by the mobile station ID "MS09011111111" exists in the position registration area represented by the position registration area ID "AREA0001".

(3) Configuration of IP Servers 500A, 500B, . . .

The IP servers 500A, 500B, . . . store sub-menu screens, as in the above-described first specific example, but the configuration of the hyperlink text string embedded in the sub-menu items used in the second specific example differ from those of the first specific example.

Now, the configuration of the hyperlink text string according to the second specific example will be described with reference to FIG. 16 and FIG. 17.

The "registration of tracking information provision" shown in FIG. 16 and FIG. 17 is a menu item for registering the mobile station 100 which is to be tracked, with the IP servers 500A, 500B, . . . for performing services such as, for example, periodically tracking the position of the mobile station 100.

Specifically, registering the ID of the mobile station with the IP servers 500A, 500B, . . . using the "registration of tracking information provision" causes the IP servers 500A, 500B, . . . to periodically inquire regarding location information of the mobile station 100 indicated by the registered ID to the gateway server 320, and obtain location information.

As shown in FIG. 16, the hyperlink text string "http://xxx.co.jp/cgi-bin/pushregist.cgi?ID=NULLID" is embedded in the menu item "registration of tracking information provision", with the data string "NULLID" included at the end of the hyperlink text string.

When the user selects "registration of tracking information provision" from the sub-menu screen shown in FIG. 17, a request signal containing the hyperlink text string "http://xxx.co.jp/cgi-bin/pushregist.cgi?ID=NULLID" is transmitted from the mobile station 100 to the gateway server 320, and at this time the predetermined data string "NULLID" is substituted with the ID of the mobile station 100 at the gateway server 320 and is transmitted to the IP servers 500A, 500B, . . . indicated by the host name. This predetermined data string "NULLID" will hereafter be referred to as "mobile station ID substituting data string".

The ID of the mobile station 100 substituted at this time is not the above-described mobile station ID made up of the telephone number of the mobile station 100, but rather is an ID uniquely determined between the gateway server 320 and IP servers 500A, 500B, . . . (hereafter called pseudo ID).

The substituted pseudo ID is temporarily stored in the IP servers 500A, 500B, . . . and the IP servers 500A, 500B, . . . are arranged so as to transmit the location information request which specified that pseudo ID to the gateway server 320.

(4) Configuration of the Gateway Server 320

Next, the configuration of the gateway server 320 will be described.

The gateway server 320 is made up of the interface unit 321 (receiving unit) described in the first specific example, subscriber information managing unit 322, data distribution managing unit 323 (receiving unit, fourth location information notifying unit, detecting unit, substituting unit, identification information adding unit, notification permission/non-permission determining unit, inquiry unit, determining unit, and error signal transmitting unit), IP server information managing unit 324 (disclosure information storing unit), location information generating unit 325 (fourth location information generating unit), and a mobile station ID table for converting mobile station IDs into pseudo IDs.

FIG. 25 is a format diagram illustrating an example of the stored contents of the mobile station ID table.

As shown in the figure, the mobile station ID table stores a "mobile station ID" and a corresponding "pseudo ID". For example, the mobile station ID "MS09011111111" corresponds to the pseudo ID "00ZDGVXAKLLG".

Upon detecting the mobile station ID substituting data string from the request signal received from the mobile station 100, the data distribution managing unit 323 of the gateway server 320 searches the mobile station ID table with the mobile station ID contained in the signal as a search key, substitutes the obtained pseudo ID with the mobile station ID substituting data string, and transmits this to one of the IP servers 500A, 500B, . . .

On the other hand, the pseudo ID transmitted to the IP servers 500A, 500B, . . . is temporarily stored within the server as described above, and a location information request with the pseudo ID specified above is transmitted from the IP servers 500A, 500B, . . . to the gateway server 320.

Then, the location information generating unit 325 of the gateway server 320 which has received the location information generating request generates location information of the specified mobile station 100. Now, the location information generating unit 325 does not generate location information using the base station ID within the inbound signal from the mobile station 100 and so forth, as with the above-described first specific example, but rather generates location information by making reference to the above-described position registration database 231 and in-zone information table 221. The details of the operation of generating location information with the gateway server 320 will be described later.

C-2-2: Operation of Second Specific Example

Next, the operation of the second specific example with the above configuration will be described with reference to the flowchart shown in FIGS. 26A, 26B and 27.

First, the user selects a desired main menu item from the main menu screen displayed on the mobile station 100, or the user directly inputs the URL of a desired IP server 500A, 500B, . . . to the mobile station 100, thereby accessing an IP server 500A, 500B, . . . (here, the IP server 500A (host name: xxx.co.jp)). Next, the IP server 500A transmits the stored sub-menu screen data (e.g., the screen data illustrated in FIG. 16) to the mobile station 100 via the gateway server 320, and the mobile station 100 receives and displays this, thereby starting the processing shown in the figure.

Once the user selects a desired menu item from the sub-menu screen displayed on the mobile station 100 (e.g., "registration of position tracking information" shown in FIG. 17), in step SP51, the mobile station 100 transmits a request signal containing the hyperlink text string "http://xxx.co.jp/cgi-bin/pushregist.cgi?ID=NULLID" embedded in the selected menu item and mobile station ID (e.g., "MS09011111111") to the gateway server 320.

In step SP53, the gateway server 320 receives the request signal.

In step SP55, the gateway server 320 determines whether or not the mobile station ID substitution data string "NULLID" is included in the received request signal.

In the event that the result of the determination is "No" (i.e., in the event that there is no mobile station ID substitution data string), the flow proceeds to step SP57, the gateway server 320 accesses one of the IP servers 500A, 500B, . . . , based on the host name contained in the hyperlink text string in the received request signal, and subsequently performs data relay processing between the mobile station 100 and the IP servers 500A, 500B, . . . , following the operations made by the user.

On the other hand, in the event that the result of the determination in step SP55 is "Yes" (i.e., in the event that there is a mobile station ID substitution data string), the flow proceeds to step SP59, the gateway server 320 searches the mobile station ID table, and obtains the pseudo ID of the mobile station 100 ("00ZDGVXAKLLG" shown in FIG. 25).

In step SP61, the gateway server 320 substitutes the mobile station ID substitution data string "NULLID" in the hyperlink text string within the request signal with the pseudo ID "00ZDGVXAKLLG", and transmits the hyperlink text string containing the substituted pseudo ID "http://xxx.co.jp/cgi-bin/pushregist.cgi?ID=00ZDGVXAKLLG" and the like as a request signal to the IP server 500A based on the host name "xxx.co.jp".

In step SP63, the IP server 500A receives and interprets the request signal, and stores the pseudo ID "00ZDGVXAKLLG" contained in the request signal as a mobile station which is to have position tracking performed thereon.

In step SP65, the IP server 500A specifies the stored pseudo ID "00ZDGVXAKLLG" and periodically transmits location information requests to the gateway server 320.

In step SP67, the gateway server 320 receives the location information request from the IP server 500A. Then, the gateway server 320 searches the mobile station ID table with the specified pseudo ID "00ZDGVXAKLLG" as a search key, and obtains the corresponding mobile station ID "MS09011111111".

In step SP69, the gateway server 320 determines whether or not the IP server 500A which has transmitted the location information request is to have the location information thereof disclosed. As described in the first specific example, this determination is made by making reference to the setting state (ON or OFF) of the location information disclosure flag within the IP information database 327.

In the event that the result of the determination in step SP69 is OFF (i.e., in the event that the IP server 500A is not to be subjected to disclosure of location information), the flow proceeds to step SP71, and the gateway server 320 transmits to the mobile station 100 a transmission impossible notification to the effect that location information cannot be transmitted to the IP server 500A. Then, in step SP73, the IP server 500A receives the transmission impossible notification.

On the other hand, in the event that the result of the determination in step SP69 is ON (i.e., in the event that the IP server 500A is to be subjected to disclosure of location information), the flow proceeds to step SP75, and the gateway server 320 determines whether or not the consent of the user of the mobile station 100 is necessary when transmitting location information to the IP server 500A. As described in the first specific example, this determination is made by making reference to the setting state (ON or OFF) of the user consent flag within the IP information database 327.

Figure 27:
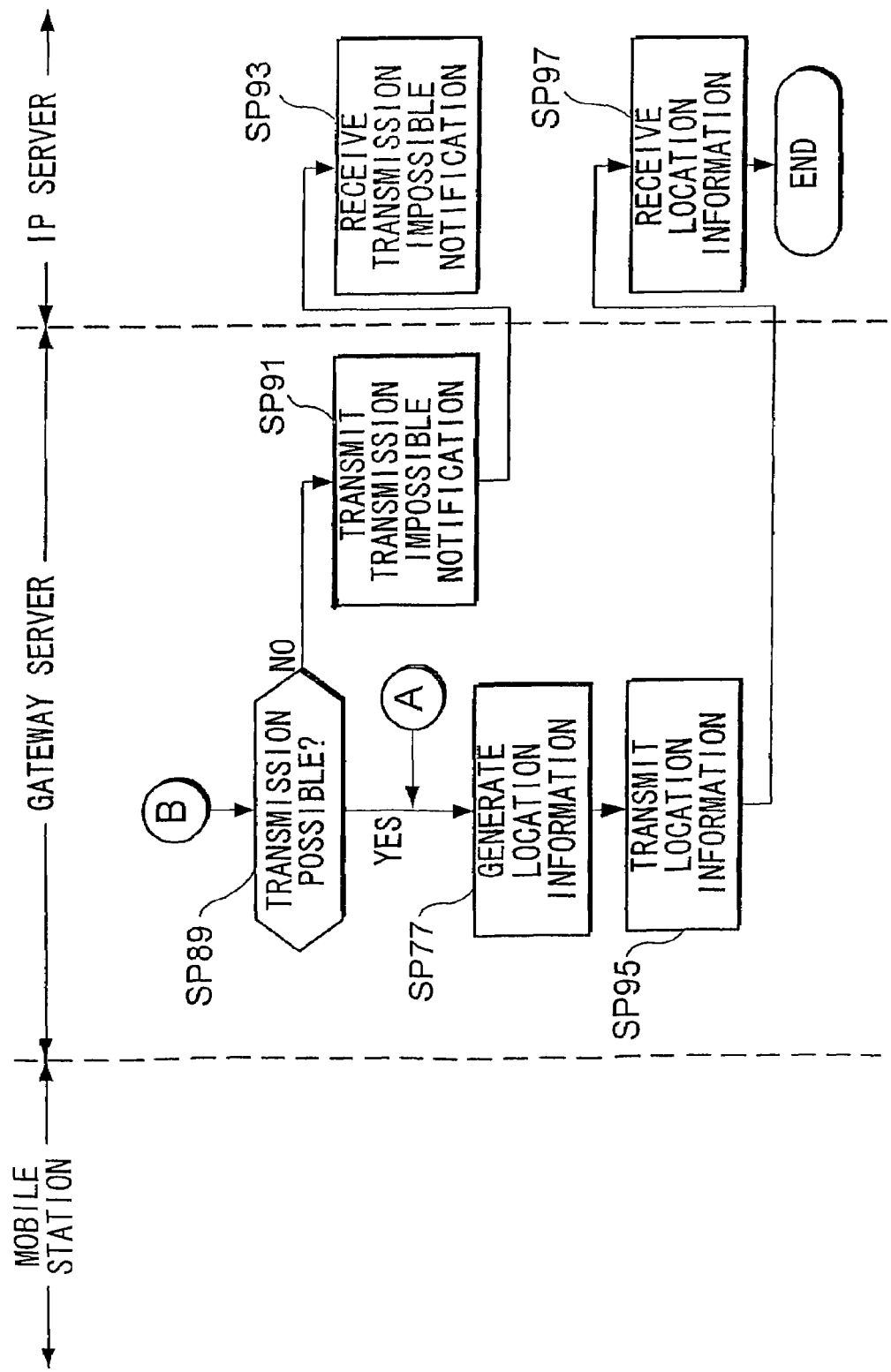
FIG. 27 is a flowchart illustrating the flow of operation of the mobile communication system according to the second specific example according to this embodiment.

In the event that the result of the determination in step SP75 is OFF (i.e., in the event that user consent is unnecessary), the flow proceeds to step SP77 in FIG. 27.

On the other hand, in the event that the result of the determination in step SP75 is ON (i.e., in the event that user consent is necessary), the flow proceeds to step SP79, and the gateway server 320 transmits input screen data for obtaining consent from the user for transmitting location information to the mobile station 100 indicated by the mobile station ID "MS09011111111".

Then, in step SP81, the mobile station 100 receives and interprets the input screen data, and displays it on the liquid crystal display.

In step SP83, the mobile station 100 accepts input regarding permission/non-permission of consent from the user.

In step SP85, the mobile station 100 transmits the input information input by the user to the gateway server 320, and in step SP87, the gateway server 320 receives the input information.

Next, in step SP89 shown in FIG. 27, the gateway server 320 interprets the input information relating to permission/non-permission of consent, and makes a determination regarding whether or not the location information may be transmitted to the IP server 500A.

In the event that the result of the determination is "No" (i.e., in the event that location information may not be transmitted to the IP server 500A), the flow proceeds to step SP91, and the gateway server 320 transmits a transmission impossible notification to the mobile station 100 to the effect that location information cannot be transmitted to the IP server 500A.

Then, in step SP93, the IP server 500A receives the transmission impossible notification.

Alternatively, in the event that the result of the determination in step SP89 is "Yes" (i.e., in the event that location information may be transmitted to the IP server 500A), the flow proceeds to step SP77, and the gateway server 320 generates location information of the mobile station 100, as described next.

First, the gateway server 320 searches the position registration database 231 with the mobile station ID as a search key, and obtains the corresponding position registration area ID. The mobile station 100 exists within the position registration area indicated by the position registration area ID obtained here.

Next, the gateway server 320 accesses the in-zone information table 221 provided in the exchange station 220 indicated by the obtained position registration area ID, searches with the mobile station ID as the search key, and obtains the corresponding base station ID.

Then, the gateway server 320 searches the region code table 328 with the obtained base station ID as a search key, obtains the corresponding region code, and takes this as the location information of the mobile station 100. In step SP95, the gateway server 320 transmits to the IP server 500A the generated location information, as the location information of the mobile station 100 indicated by the pseudo ID "00ZDGVXAKLLG".

In step SP97, the IP server 500A receives the location information of the mobile station 100, and transmits position related information to the mobile station 100, as appropriate, in response to the received location information.

With the above-described first and second specific examples of the third embodiment; predetermined data strings decided upon between the gateway server 320 and the IP servers 500A, 500B, . . . are to be substituted with location information and mobile station IDs, so location information can be notified to the IP server 500 in a form not dependent on the specifications of the mobile station 100.

Also, the gateway server 320 determines whether or not notification of location information is permissible, based on disclosure standard information such as the location information disclosure flag and the like, so security regarding the location information of the mobile station 100 is secured.

C-3: Modifications of Third Embodiment

As already described, the present invention is not restricted to the above third embodiment, rather, various modifications may be made. For example, the following modifications may be made with the first and second specific examples of the third embodiment.

(1) Arrangement of IP Servers 500A, 500B . . .

With the first and second specific examples described above, the IP servers 500A, 500B . . . are connected to the gateway server 320 via the Internet 400, but the invention is not necessarily restricted to such a connection arrangement.

For example, the IP servers 500A, 500B . . . may be connected to the gateway server 320 via dedicated lines, or may be provided within the mobile communication network.

Also, though with the first and second specific examples the IP servers 500A, 500B . . . have functions of providing some sort of information to the mobile station 100, the invention is not restricted to this and these may just be computers.

For example, in the second specific example, the IP server 500 may periodically obtain the location information of the mobile station 100 and provided the location information obtained as the result thereof to a predetermined information processing device (e.g., an administration center or the like which performs operational administration of vehicles in which mobile stations 100 are mounted), or the IP server 500 may simply accumulate the obtained location information without making output to other terminals.

(2) Arrangement of Location Information Substitution Data String or Mobile Station ID Substitution Data String In the first and second specific examples described above, the location information substitution data string "NULLAREA" or mobile station ID substitution data string "NULLID" were added to the end of the hyperlink text string contained in the request signal. However, this arrangement is not essential, and including the above substitution data strings at predetermined positions within the request signal transmitted from the mobile station 100 suffices. Also, the data string does not need to be the text strings "NULLAREA" and "NULLID"; these may be other text strings instead.

(3) Arrangement of Location Information Description Format

Also, in the first and second specific examples described above, location information can be supplied to various IP servers by converting the predetermined text string determined beforehand into location information.

However, the invention is not restricted to this, and matching the description format for location information between the mobile stations 100 and the IP servers 500A, 500B . . . will suffice. That is to say, the IP servers 500A, 500B . . . may notify the mobile stations 100 of the location information description format beforehand, such that the mobile stations 100 describe the location information based on the notified format, and transmit this to the IP servers 500A, 500B . . . .

An example of the notification processing of the above location information description format is as follows. First, the IP servers 500A, 500B . . . describe the description format of location information within a predetermined file, add a specific suffix to a file indicating that the file specifies the location information description format, and send this to the mobile stations 100. The mobile stations 100 make reference to the file and obtain the location information description format.

(4) Arrangement of Location Information Generation

In the first and second specific examples described above, the mobile communication network including the gateway server 320 generated the location information of the mobile stations 100; however, the invention is not restricted to such, and location information of mobile stations 100 generated by other means may be notified to the IP servers 500A, 500B . . . .

The following is a description of a specific example of other means for generating location information of a mobile station 100.

For example, the user may input location information to the mobile station 100 by operating the keys himself/herself.

First, the data distribution managing unit 323 (input screen transmitting unit and specified location information receiving unit) of the gateway server 320 transmits specified location information input screen data for inputting user-specified location information, along with input screen data for inquiring of consent for transmitting the location information, to the mobile station 100.

The mobile station 100 interprets the received specified location information input screen data and displays this on the liquid crystal display. The user inputs more specific location information to the specified location information input screen data displayed on the mobile station 100, such as the position with respect to a certain building like "East entrance of station A", or the "address" itself of the location of the user.

The mobile station 100 then transmits the specified location information input by the user to the gateway server 320. The gateway server 320 transmits the specified location information received from the mobile station 100 to the IP servers 500A, 500B . . . along with the location information generated by its location information generating unit 325.

In the event that the notified location information is detailed, the IP servers 500A, 500B . . . can correspondingly provide detailed and precise position related information.

Also, the mobile station 100 may be provided with a measuring unit (position measuring unit) such as GPS or the like.

The mobile station 100 measures the position of the mobile station 100 with the above position measuring unit and transmits the obtained position measurement information to the data distribution managing unit 323 (position measurement information receiving unit) of the gateway server 320.

The gateway server 320 transmits only location information generated by the location information generating unit 325 to the IP servers 500A, 500B . . . with regard to mobile stations 100 not provided with the above position measuring means, and transmits the position measurement information received from the mobile station 100 in addition to the location information generated by the location information generating unit 325 to the IP servers 500A, 500B . . . with regard to mobile stations 100 provided with the above position measuring means.

Now, the operation for the gateway server 320 to transmit the location information and position measurement information to the IP servers 500A, 500B . . . will be described in detail.

The position related information which is transmitted from the gateway server 320 to the IP servers 500A, 500B . . . is made up of an 8-character text string.

Of the 8-character text string, the four upper characters indicate the location information generated by the location information generating unit 325, and the four lower characters indicate the position measurement information measured by the position measurement means. Further, in the event that measurement by the position measurement means is impossible, or in the event that the mobile station 100 is not provided with position measuring means, the 4-character text string "0000" indicates that position measurement information does not exist.

For example, regarding location information of a mobile station 100 not provided with position measuring means, in the event that the location information generated by the gateway server 320 is "1-Chome, Shibuya-ku, Tokyo" (which is represented by the text string "C49D"), the 8-character text string is "C49D0000".

On the other hand, regarding location information of a mobile station 100 provided with position measuring means, in the event that the location information generated by the gateway server 320 is "1-Chome, Shibuya-ku, Tokyo", and the position measurement information generated by the position measuring means is "1-1 1-Chome, Shibuya-ku, Tokyo", the text string "7236" representing "1-1" is inserted in to the lower four characters, so the 8-character text string is "C49D7236".

Generally, using position measuring means such as GPS allows positions to be measured in a more detailed manner than the location information generated by the mobile communication network. Accordingly, in the event the above-described 8-character text string configuration is employed, the IP servers 500A, 500B . . . would only refer to the upper four characters of the 8-character text string in the event that only general position related information is to be provided to the user, and would make reference to the lower four characters in the event of providing detailed position related information, which is to say that the location information reference operation can be changed according to the level of position related information to be provided to the mobile stations 100.

Further, in the event that the lower four characters are "0000" (i.e., there is no position measurement information), and in the event that the IP servers 500A, 500B . . . determine that more detailed location information is necessary, the gateway server 320 may be requested to transmit input screen data to the mobile station 100 for the user to input detailed location information.

Thus, the IP servers 500A, 500B . . . would change the location information referring operation as appropriate, so the gateway server 320 does not need to perform the determination processing and the like regarding whether to transmit general location information or detailed location information to the IP servers 500A, 500B . . . .

(5) Operation of the Gateway Server 320 and IP Servers 500A, 500B . . . in the Event of not Disclosing Location Information In the above-described first specific example, in the event that the location information of the mobile station 100 is not disclosed to the IP servers 500A, 500B . . . , the gateway server 320 transmits a location information transmission impossible notification to the mobile station 100, but the invention is not restricted to this, and the transmission impossible notification may be transmitted to the IP servers 500A, 500B . . . to be accessed.

Then, upon receiving the transmission impossible notification, the IP servers 500A, 500B . . . transmit screen data to the effect that location information cannot be obtained (hereafter referred to as error screen data) to the mobile station 100, and the mobile station 100 displays the error screen.

Then, the above-described transmission impossible notification may be transmitted from the gateway server 320 to the both the mobile station 100 and the IP servers 500A, 500B . . . .

Further, various arrangements may be conceived for the arrangement of the above transmission impossible notification, as described below. For example, in the above first specific example, an arrangement may be made wherein, even in the event that the location information may not be transmitted, the gateway server 320 transmits a request signal to the IP servers 500A, 500B . . . containing the location information substitution data string "NULLAREA" within the hyperlink text string of the IP servers 500A, 500B . . . . Then, upon detecting the location information substitution data string "NULLAREA" within the request signal, the IP servers 500A, 500B . . . interpret the location information substitution data string to mean that location information may not be transmitted.

Then, in the event that location information may not be transmitted, the gateway server 320 may replace the location information substitution data string "NULLAREA" with a predetermined keyword indicating that transmission is impossible (hereafter referred to as error keyword) and transmit it to the IP servers 500A, 500B . . . .

Further, an arrangement may be made wherein link information to a site which provides error screen data displayed on the mobile station 100 may be inserted within this error keyword, so that the error screen data is transmitted from the site to the mobile station 100.

Such arrangements may be similarly applied to the second specific example, as well.

(6) Types of Information Serving as Location Information Disclosure Standards

With the above first and second specific examples, the gateway server 320 performs a determination of whether location information may or may not be disclosed to the IP servers 500A, 500B . . . , by making reference to the IP information database 327. This IP information database 327 had been set with location information disclosure flags and user consent flags, but information serving as disclosure standards is not necessarily limited to this flag information alone; rather, various arrangements may be conceived, as described below.

For example, IP servers 500A, 500B . . . to which location information for each mobile station 100 is to be disclosed may be set.

FIG. 28 is a data format diagram of a database provided in the gateway server 320 in such a case.

As shown in the figure, this database (disclosure information storing unit) has an "IP server name" registered for each "mobile station ID" to which location information is to be disclosed.

For example, the location information of the mobile station ID "MS0901111111" shown in the figure permits disclosure to "IP servers 500A, 500D, 500H . . . ". The user of the mobile station TOO notifies the IP server name to which disclosure is to be performed to the communications company operating the mobile communication network beforehand, and the communications company registers in this database the IP server names to be disclosed based on this notification. The gateway server 320 makes reference to this database and determines whether or not location information can be disclosed.

That is to say, disclosure standards for each IP server 500A, 500B are set for each mobile station 100, unlike the arrangement in the above first and second specific examples wherein a uniform location information disclosure standard is set for all of the IP servers 500A, 500B . . . .

Also, specific mobile stations 100 may be set such that the location information thereof is not disclosed at all.

FIG. 29 is a data format diagram of a database provided in the gateway server 320 in such a case.

As shown in the figure, the mobile station ID of a mobile station 100 which does not disclose location information is registered in this database (terminal information storing unit). In the event that the user does not want to disclose his/her own location information to any server at all, notification to this effect is made to the communications company operating the mobile communication network beforehand, and, based on this notification, the communications company registers this mobile station ID to this database. The gateway server 320 makes reference to this database and determines whether or not location information can be disclosed.

Providing various disclosure standards as described above allows various user needs to be met, such as notifying only a specific IP server 500 of location information, or not wanting location information to be known at all.

(7) Types of Mobile Communication Terminal Serving as Location Information Disclosure Standards While the first and second specific examples involved using mobile stations such as cellular telephones and PHSs and the like, the invention is not restricted to this, and mobile communication terminals such as PDAs (Personal digital Assistants) may be used, as long as they are provided with functions for performing wireless communication of data with the base station 210 of the mobile communication network.

(8) Description Language for Data

With the first and second specific examples, data was exchanged between the gateway server 320 and IP servers 500A, 500B..., and the mobile stations 100 in the HTML format, but the invention is not restricted to this, and other description languages such, for example, as XML (Extensible Markup Language) may be used.

The invention claimed is:

1. A location information notifying method for notifying a predetermined computer of location information of a mobile communication terminal obtained on one of a plurality of mobile communication networks including a first mobile communication network and a second mobile communication network with differing representational formats for location information generated thereby, that contains mobile communication terminals capable of wireless communication, said computer to which said location information is notified being a plurality of computers including a first computer capable of handling said location information in a first representational format and a second computer capable of handling said location information in a second representational format, said location information notifying method comprising:

detecting the position of said mobile communication terminals and generating the location information thereof, wherein location information of a mobile communication terminal belonging to a first mobile communication network is generated in a third representational format, and location information of a mobile communication terminal belonging to a second mobile communication network is generated in a fourth representational format;

wherein said third or said fourth representational formats comprise one of:

a format representing identification information provided to base stations of said respective mobile communication networks;

a format representing identification information provided to wireless communication zones of a predetermined number of said base stations;

a format representing identification information provided to partial areas of wireless zones of said base stations; and a format representing latitude and longitude;

a location information converting step wherein, in the event of notifying said location information of said mobile communication terminal belonging to said respective first or second mobile communication network to said first computer, said location information is converted from said respective third or fourth representational format into said first representational format, and in the event of making notification of location information of said mobile communication terminal belonging to said respective first or second mobile communication network to said second computer, said location information is converted from said respective third or fourth representational format into said second representational format; and a location information notifying step of notifying said computers of said location information with the representational format thereof converted.

2. A location information notifying method according to claim 1, wherein said first and said second representational formats are one of:

a format representing latitude and longitude information; and a format representing an administrative district.

3. A location information notifying method for notifying a predetermined computer of location information of a mobile communication terminal obtained on a mobile communication network which contains mobile communication terminals capable of wireless communication, said location information notifying method comprising:

obtaining a detected location of a mobile communication terminal;

generating location information indicative of the detected location of the mobile communication terminal;

determining a level of precision of location information needed by a computer that is in communication with the mobile communication terminal, wherein the computer is configured to provide position related information to the mobile communication terminal based on location information that is at or above the determined level of precision;

converting the location information to the determined level of precision; and notifying to said computer said converted location information.

4. A location information notifying method according to claim 3, wherein said location information with a level of precision needed by said computer includes one of:

location information representing latitude and longitude information; and location information representing an administrative district.

5. A location information notifying method according to claim 3, wherein converting the location information to the determined level of precision comprises converting only when the level of precision is lower than what is needed.

6. A location information notifying method for notifying a predetermined computer of location information of a mobile communication terminal obtained on a mobile communication network which contains mobile communication terminals capable of wireless communication, said location information notifying method comprising:

detecting the position of said mobile communication terminal and generating location information; and notifying said computer of said generated location information by:

detecting a predetermined data sequence within data transmitted from said mobile communication terminal to said computer; and substituting said location information for said predetermined data sequence to add said generated location information to data transmitted from said mobile communication terminal to said computer.

7. A location information notifying method according to claim 6, wherein notifying said computer includes:

notifying to said mobile communication terminal the substitution of said location information for said predetermined data sequence prior to notifying said computer.

8. A location information notifying method according to claim 6, wherein said predetermined data sequence is contained within data transmitted from said computer to said mobile communication terminal;

and wherein notifying said computer includes detecting said data sequence in the process of said mobile communication terminal returning data transmitted from said computer, and substituting this with said location information.

9. A location information notifying method for notifying to a predetermined computer, location information of a mobile communication terminal obtained from a mobile communication network which contains mobile communication terminals capable of wireless communication, said location information notifying method comprising:
  relaying communication between a mobile communication terminal and a computer, wherein said communication includes identification information of said mobile communication terminal;
  receiving from said computer a request signal requesting location information of said mobile communication terminal;
  detecting the location of said mobile communication terminal in response to said request signal based on said identification information, and generating location information of said mobile communication terminal;
  detecting a predetermined data sequence within data transmitted from said mobile communication terminal to said computer; and
  substituting said predetermined data sequence with said identification information.

10. A location information notifying method according to claim 9, wherein said predetermined data sequence is contained within the data transmitted from said computer to said mobile communication terminal;
  and wherein detecting said data sequence occurs in the process of said mobile communication terminal returning the data transmitted from said computer, and substituting this with said identification information.

11. A location information notifying method according to either claim 6 or 9, further comprising:
  a notification permission/non-permission determining step of determining whether or not said location information may be notified to said computer;
  wherein said location information notifying step notifies said location information based on the determination result in said notification permission/non-permission determining step.

12. A location information notifying method according to claim 11, wherein disclosure information regarding whether or not a computer is to have said location information disclosed thereto is stored in predetermined storing means beforehand;
  and wherein said notification permission/non-permission determining step makes said determination by referring to said disclosure information stored by said storing means with regard to said computer which is to have said location information disclosed thereto.

13. A location information notifying method according to claim 12, wherein said disclosure information is stored in said predetermined storing means beforehand for each mobile communication terminal;
  and wherein said notification permission/non-permission determining step makes said determination by referring to said disclosure information stored by said storing means with regard to said computer which is to have said location information disclosed thereto.

14. A location information notifying method according to claim 11, wherein said notification permission/non-permission determining step comprises:
  a step of making an inquiry to said mobile communication terminal regarding whether or not said location information may be notified to said computer; and
  a step of making said determination based on response information from said mobile communication terminal to said inquiry.

15. A location information notifying method according to claim 11, wherein terminal information, relating to whether or not said location information may be disclosed outside of said mobile communication network with regard to a mobile communication terminal, is stored in predetermined storage means beforehand;
  and wherein said notification permission/non-permission determining step makes said determination by referring to terminal information stored in said storage means with regard to said mobile communication terminal relating to said location information of which notification is to be made.

16. A location information notifying method according to claim 11, further comprising an error signal transmitting step of, in the event that it has been determined that transmission is not permissible in said notification permission/non-permission determination step, transmitting a transmission error signal to said mobile communication terminal or said computer to the effect that said location information may not be notified.

17. A location information notifying method according to either claim 6 or 9, further comprising:
  an input screen transmitting step of transmitting input screen data for inputting to said mobile communication terminal specified location information which the user of said mobile communication terminal can specify; and
  a specified location information receiving step of receiving from said mobile communication terminal said specified location information input by said user;
  wherein said location information notifying step notifies said computer of said specified location information received in said specified location information receiving step, along with said location information generated in said location information generating step.

18. A location information notifying method according to either claim 6 or 9, wherein said mobile communication terminal comprises position measuring means for measuring its own position;
  wherein said location information notifying method comprises receiving from said mobile communication terminal measured location information relating to the position of said mobile communication terminal measured by a position measuring means;
  and notifying said computer of said measured location information, along with said location information.

19. A location information notifying method according to any of the claim 1, 6, or 9, wherein said computer is an information providing server for providing said mobile communication terminal with position-related information relating to the position of said mobile communication terminal.

20. A location information notifying method according to any one of the claims 1, 3, 6, and 9, wherein said mobile communication terminal is a cellular phone which performs wireless telephone communication.

21. A location information notifying apparatus for notifying a predetermined computer of location information of a mobile communication terminal obtained on one of a plurality of mobile communication networks, including a first mobile communication network and a second mobile communication network with differing representational formats for location information generated thereby, that contain mobile communication terminals capable of wireless communication, said computer to which said location information is notified being a plurality of computers including a first computer capable of handling said location information in a first representational format and a second computer capable of handling said location information in a second representational format, said location information notifying apparatus comprising:
  a location information generating unit configured to detect the position of said mobile communication terminal and generate the location information thereof,
  wherein location information of a mobile communication terminal belonging to the first mobile communication network is generated in a third representational format, and location information of a mobile communication terminal belonging to the second mobile communication network is generated in a fourth representational format;
  wherein said third or said fourth representational formats comprise one of:
    a format representing identification information provided to base stations of said respective mobile communication networks;
    a format representing identification information provided to wireless communication zones of a predetermined number of said base stations;
    a format representing identification information provided to partial areas of wireless zones of said base stations; and
    a format representing latitude and longitude;
  a location information representational format converting unit which, in the event of notifying said location information of said mobile communication terminal belonging to said respective first or second mobile communication network to said first computer, converts said location information from said respective third or fourth representational format into said first representational format, and in the event of notifying said location information of said mobile communication terminal belonging to said respective first or second mobile communication network to said second computer, said location information is converted from said respective third or fourth representational format into said second representational format; and
  a first location information notifying unit for notifying said computer of said location information with the representational format thereof converted.

22. A location information notifying apparatus according to claim 21, wherein said first and said second representational formats are one of:
  a format representing latitude and longitude information; and
  a format representing an administrative district.

23. A location information notifying apparatus for notifying a predetermined computer of location information of a mobile communication terminal obtained on a mobile communication network which contains mobile communication terminals capable of wireless communication, said location information notifying apparatus comprising:
  a location information generating unit for detection of the position of said mobile communication terminal and generation of location information at one of a plurality of different levels of precision,
  wherein said location information generating unit is configured to determine a level of precision of said location information that is needed by said computer and,
  wherein said location information generating unit is configured to generate said location information based on the determined level of precision so that said location information is generated at or above the determined level of precision; and
  a position notifying unit for notification of said computer of said generated location information.

24. A location information notifying apparatus according to claim 23, wherein said location information with a level of precision needed by said computer includes one of:
  location information representing latitude and longitude information; and
  location information representing administrative district.

25. A location information notifying apparatus for notifying a predetermined computer of location information of a mobile communication terminal obtained on a mobile communication network which contains mobile communication terminals capable of wireless communication, said location information notifying apparatus comprising:
  a location information generating unit for detection of the position of said mobile communication terminal and generation of location information based on information included in communication received by said location information generating unit from said mobile communication terminal; and
  a location information notifying unit configured to transmit data between said mobile communication terminal and said computer, wherein said generated location information is to be added to data relayed from said mobile communication terminal to said computer by said location information notifying unit and wherein said location information notifying unit comprises:
    a detecting unit for detecting a predetermined data sequence within data transmitted from said mobile communication terminal to said computer; and
    a substituting unit for substituting said location information for said predetermined data sequence.

26. A location information notifying apparatus according to claim 25, wherein said location information notifying unit comprises:
  a receiving unit for receiving notification indicating the adding method of said generated location information added to said data from said computer; and
  a transmitting unit for adding said generated location information to said data by said method and transmitting.

27. A location information notifying apparatus according to claim 25, wherein said predetermined data sequence is contained within data transmitted from said computer to said mobile communication terminal;
  and wherein said location information notifying unit detects said data sequence in the process of said mobile communication terminal returning the data transmitted from said computer, and substitutes this with said location information.

28. A location information notifying apparatus according to claim 25, further comprising:
  a notification permission/non-permission determining unit for determining whether or not said location information may be notified to said computer;
  wherein said location information notifying unit notifies said location information based on the determination result from said notification permission/non-permission determining unit.

29. A location information notifying apparatus according to claim 28, comprising a disclosure information storing unit for storing therein disclosure information regarding whether or not said computer is to have said location information disclosed thereto;
  wherein said notification permission/non-permission determining unit makes said determination by referring to said disclosure information stored by said disclosure information storing unit with regard to said computer which is to have said location information disclosed thereto.

30. A location information notifying apparatus according to claim 29, wherein said disclosure information storing unit stores said disclosure information for each mobile communication terminal;
and wherein said notification permission/non-permission determining unit makes said determination by referring to said disclosure information stored by said disclosure information storing unit with regard to said computer which is to have said location information disclosed thereto.

31. A location information notifying apparatus according to claim 28, wherein said notification permission/non-permission determining unit comprises:
an inquiry unit for making an inquiry to said mobile communication terminal regarding whether or not said location information may be notified to said computer; and
a determining unit for making said determination based on response information from said mobile communication terminal to said inquiry.

32. A location information notifying apparatus according to claim 28, comprising a terminal information storing unit for storing terminal information relating to whether or not said location information may be disclosed outside of said mobile communication network with regard to a mobile communication terminal;
wherein said notification permission/non-permission determining unit makes said determination by referring to said terminal information stored in terminal information storing unit, regarding said mobile communication terminal relating to said location information of which notification is to be made.

33. A location information notifying apparatus according to claim 28, comprising an error signal transmitting unit for, in the event that it has been determined that transmission is not permissible by said notification permission/non-permission determining unit transmitting a transmission error signal to said mobile communication terminal or said computer to the effect that said location information may not be notified.

34. A location information notifying apparatus according to claim 25, comprising:
an input screen transmitting unit for transmitting input screen data for inputting to said mobile communication terminal specified location information which the user of said mobile communication terminal can specify; and
a specified location information receiving unit for receiving from said mobile communication terminal said specified location information input by said user;
wherein said location information notifying unit notifies said computer of said specified location information received by said specified location information receiving unit, along with said location information generated by said location information generating unit.

35. A location information notifying apparatus according to claim 25, wherein said mobile communication terminal comprises a position measuring unit for measuring its own position;
wherein said location information notifying apparatus comprises a measured location information receiving unit for receiving from said mobile communication terminal measured location information relating to the position of said mobile communication terminal measured by said position measuring unit;
and wherein said location information notifying unit notifies said computer of said measured location information received by said measured location information receiving unit, along with said location information generated by said location information generating unit.

36. A location information notifying apparatus for notifying a predetermined computer of location information of a mobile communication terminal obtained on a mobile communication network which contains mobile communication terminals capable of wireless communication, said location information notifying apparatus comprising:
a receiving unit configured to receive a request signal being relayed from said mobile communication terminal to said computer, wherein said request signal comprises identification information of said mobile communication terminal and a request for location information;
a location information generating unit configured to detect the position of said mobile communication terminal in response to said request signal, wherein said location information generating unit is configured to determine and generate location information as a function of said identification information; and
a location information notifying unit configured to include notification of said generated location information to said computer with said request signal, wherein said location information notifying unit comprises:
a detecting unit for detecting a predetermined data sequence within data transmitted from said mobile communication terminal to said computer; and
a substituting unit for substituting said generated location information for said predetermined data sequence.

37. A location information notifying apparatus according to claim 36, further comprising:
an identification information adding unit for adding identification information of said mobile communication terminal to said data transmitted from said mobile communication terminal to said computer, and transmitting this to said computer;
wherein said location information generating unit determines the mobile communication terminal for which location information is to be generated and generates said location information, based on said identification information.

38. A location information notifying apparatus according to claim 36, wherein said predetermined data sequence is contained within the data transmitted from said computer to said mobile communication terminal;
and wherein said identification information adding unit detects said data sequence in the process of said mobile communication terminal returning data transmitted from said computer, and substitutes this with said information.

39. A location information notifying apparatus according to claim 36, further comprising:
a notification permission/non-permission determining unit for determining whether or not said location information may be notified to said computer;
wherein said location information notifying unit transmits said location information based on the determination result from said notification permission/non-permission determining unit.

40. A location information notifying apparatus according to claim 39, comprising a disclosure information storing unit for storing therein disclosure information regarding whether or not a computer is to have said location information disclosed thereto;

wherein said notification permission/non-permission determining unit makes said determination by referring to said disclosure information stored by said disclosure information storing unit with regard to said computer which is to have said location information disclosed thereto.

41. A location information notifying apparatus according to claim 40, wherein said disclosure information storing unit stores said disclosure information for each mobile communication terminal;

and wherein said notification permission/non-permission determining unit makes said determination by referring to said disclosure information stored by said disclosure information storing unit with regard to said computer which is to have said location information disclosed thereto.

42. A location information notifying apparatus according to claim 39, wherein said notification permission/non-permission determining unit comprises:

an inquiry unit for making inquiry to said mobile communication terminal regarding whether or not said location information may be notified to said computer; and a determining unit for making said determination based on response information from said mobile communication terminal to said inquiry.

43. A location information notifying apparatus according to claim 39, comprising a terminal information storing unit for storing terminal information relating to whether or not said location information may be disclosed outside of said mobile communication network with regard to a mobile communication terminal;

wherein said notification permission/non-permission determining unit makes said determination by referring to terminal information stored in said terminal information storing unit, regarding said mobile communication terminal relating to said location information of which notification is to be made.

44. A location information notifying apparatus according to claim 39, comprising an error signal transmitting unit for transmitting, in the event that it has been determined that transmission us not permissible has been made by said permission/non-permission determining unit, a transmission error signal to said mobile communication terminal or said computer to the effect that said location information may not be notified.

45. A location information notifying apparatus according to claim 36, comprising:

an input screen transmitting unit for transmitting to said mobile communication terminal input screen data for inputting specified location information which the user of said mobile communication terminal can specify; and a specified location information receiving unit for receiving from said mobile communication terminal said specified location information input by said user;

wherein said location information notifying unit notifies said computer of said specified location information received by said specified location information receiving unit, along with said location information generated by said location information generating unit.

46. A location information notifying apparatus according to claim 36, wherein said mobile communication terminal comprises a position measuring unit for measuring its own position;

wherein said location information notifying apparatus comprises a measured location information receiving unit for receiving from said mobile communication terminal measured location information relating to the position of said mobile communication terminal measured by said position measuring unit;

and wherein said location information notifying unit notifies said computer of said measured location information received by said measured location information receiving unit, along with said location information generated by said location information generating unit.

47. A location information notifying apparatus according to any one of the claims 21, 23, 25, and 36, wherein said computer is an information providing server for providing said mobile communication terminal with position-related information relating to the position of said mobile communication terminal.

48. A location information notifying apparatus according to any one of the claims 21, 23, 25, and 36, wherein said mobile communication terminal is a cellular phone which performs wireless telephone communication.

49. A method for notification of a location of a mobile communication terminal, the method comprising:

determining a location of mobile communication terminal in a communication network based on identification information of the mobile communication terminal received over the communication network;

generating location information indicative of the determined location of the mobile communication terminal, wherein the format of the location information that is generated is selected from the group consisting of a format representing identification information provided to base stations of said mobile communication network, a format representing identification information provided to wireless communication zones of a predetermined number of said base stations, a format representing identification information provided to partial areas of wireless zones of said base stations and a format representing latitude and longitude;

converting the location information to a format that is compatible with a computer in communication with the mobile communication terminal, wherein the computer is configured to provide position related information to the mobile communication terminal; and transmitting the converted location information over the communication network for receipt by the computer.

50. A method for notification of a location of a mobile communication terminal, the method comprising:

determining a location of mobile communication terminal in a communication network based on identification information of the mobile communication terminal received over the communication network;

generating location information indicative of the determined location of the mobile communication terminal;

converting the location information to a format that is compatible with a computer in communication with the mobile communication terminal, wherein the computer is configured to provide position related information to the mobile communication terminal;

detecting a determined data sequence within data being relayed from the mobile communication terminal to the computer;

substituting the converted location information for the determined data sequence; and transmitting the converted location information over the communication network for receipt by the computer.

51. The method according to any one of claim 49 or 50, further comprising relaying data between the mobile communication terminal and the computer over the communication network, wherein said computer is configured to provide data to said mobile communication terminal in response to a request from said mobile communication terminal.

52. The method according to any one of claim 49 or 50, wherein converting the location information comprises determining the level of precision of the location information needed by the computer, and converting the location information to the needed level of precision.

53. The method according to any one of claim 49 or 50, wherein converting the location information comprises determining the format of the location information needed by the computer, and converting the location information to the needed format.

54. A system for notification of a location of a mobile communication terminal in a mobile communication network, the system comprising:

a first computer that includes a position measurement center configured to determine a location of the mobile communication terminal operable within the mobile communication network;

the position measurement center also configured to generate location information indicative of the determined location of the mobile communication terminal;

the first computer also includes a location information converting device, the location information converting device configured to convert the location information to a format that is compatible with a second computer in communication with the mobile communication terminal, wherein the location information converting device is configured to convert the location information from a format selected from the group consisting of a format representing identification information provided to base stations of said mobile communication network, a format representing identification information provided to wireless communication zones of a predetermined number of said base stations, a format representing identification information provided to partial areas of wireless zones of said base stations and a format representing latitude and longitude; and the first computer also includes a location information providing unit, the location information providing unit configured to transmit the converted location information over a communication network for receipt and use by the second computer in communication with the mobile communication terminal.

55. A system for notification of a location of a mobile communication terminal in a mobile communication network, the system comprising:

a first computer that includes a position measurement center configured to determine a location of the mobile communication terminal operable within the mobile communication network;

the position measurement center also configured to generate location information indicative of the determined location of the mobile communication terminal;

the first computer also includes a location information converting device, the location information converting device configured to convert the location information to a format that is compatible with a second computer in communication with the mobile communication terminal; and the first computer also includes a location information providing unit, the location information providing unit configured to transmit the converted location information over a communication network for receipt and use by the second computer in communication with the mobile communication terminal;

wherein the first computer also includes a data distribution managing unit configured to substitute converted location information for a predetermined data sequence, the predetermined data sequence included in data being relayed from the mobile communication terminal to the second computer.

56. The system according to any of claim 54 or 55, wherein the first computer is a gateway server and the second computer is an information provider server.

57. The system according to any one of claim 54 or 55, wherein the first computer is configured to relay data communicated over the communication network between the mobile communication terminal and the second computer.

58. The system according to any one of claim 54 or 55, wherein the location information converting device is configured to identify a predetermined format for the location information that is compatible with the second computer.

59. The system according to any one of claim 54 or 55, wherein the location information converting device is configured to identify a level of precision of the location information based on a predetermined level of precision requirement of the second computer.

60. A location information notification method for notifying a predetermined computer of location information of a mobile communication terminal, the method comprising:

providing a first mobile communication network and a second mobile communication network each configured to generate different formats of location information;

generating location information of a first mobile communication terminal in a first format based on a detected position of the first mobile communication terminal in the first mobile communication network;

generating location information of a second mobile communication terminal in a second format based on a detected position of the second mobile communication terminal in the second mobile communication network;

wherein each of the first and second formats are one of:

a format representing identification information provided to base stations of said respective first or second mobile communication networks, a format representing identification information provided to wireless communication zones of a predetermined number of said base stations, a format representing identification information provided to partial areas of wireless zones of said base stations, and a format representing latitude and longitude;

converting the location information in the first format or the location information in the second format to a format that is compatible with a computer in communication with the mobile communication terminal, wherein the computer is configured to provide position related information to the mobile communication terminal; and transmitting the converted location information over the communication network for receipt by the computer.

61. A system for notification of a position of mobile communication terminals within a first mobile communication network and a second mobile communication network, wherein the first and second mobile communication networks are configured to generate different formats of location information, the system comprising:

a location information generating unit configured to generate location information of a first mobile communication terminal in a first format based on a detected position of the first mobile communication terminal within the first mobile communication network, and the location information generating unit configured to generate location information of a second mobile communication terminal in a second format based on a detected position of the second mobile communication terminal within the second mobile communication network, wherein each of the first and second formats are one of: a format representing identification information provided to base stations of said respective first or second mobile communication networks, a format representing identification information provided to wireless communication zones of a predetermined number of said base stations, a format representing identification information provided to partial areas of wireless zones of said base stations, and a format representing latitude and longitude;

a location information representational format converting unit configured to convert the location information in the first format or the location information in the second format to a format that is compatible with a computer in communication with the respective first or second mobile communication terminal wherein the computer is configured to provide location-related information to the respective first or second mobile communication terminal; and a location information notifying unit configured to transmit the converted location information over the communication network to the computer.

62. A system for notification of a position of mobile communication terminals within a first mobile communication network and a second mobile communication network, wherein the first and second mobile communication networks are configured to generate different formats of location information, the system comprising:

a location information generating unit configured to generate location information of a first mobile communication terminal in a first format based on a detected position of the first mobile communication terminal within the first mobile communication network, and the location information generating unit configured to generate location information of a second mobile communication terminal in a second format based on a detected position of the second mobile communication terminal within the second mobile communication network;

a location information representational format converting unit configured to convert the location information in the first format or the location information in the second format to a format that is compatible with a computer in communication with the respective first or second mobile communication terminal, and where the location information representational format converting unit is further configured to convert the location information in the first format or the location information in the second format to a format with a level of precision at or above a predetermined level of precision requirement of the computer, wherein the computer is configured to provide location-related information to the respective first or second mobile communication terminal; and a location information notifying unit configured to transmit the converted location information over the communication network to the computer.

\* \* \* \* \*

UNITED STATES PATENT AND TRADEMARK OFFICE
CERTIFICATE OF CORRECTION

PATENT NO. : 7,010,306 B1
APPLICATION NO. : 09/786818
DATED : March 7, 2006
INVENTOR(S) : Youichi Tanibayashi et al.

Page 1 of 1

It is certified that error appears in the above-identified patent and that said Letters Patent is hereby corrected as shown below:

On the Title Page, Item (57) ABSTRACT

Line 7, after "may" insert --be--
Line 13, after "information" insert --to--

Column 43, Line 47, change "us" to --is--

Column 46, Line 16, change "claim" to --claims--

Column 46, Line 19, change "claim" to --claims--

Column 46, Line 23, change "claim" to --claims--

Column 46, Line 27, change "claim" to --claims--

Signed and Sealed this

First Day of August, 2006

JON W. DUDAS
*Director of the United States Patent and Trademark Office*

UNITED STATES PATENT AND TRADEMARK OFFICE
CERTIFICATE OF CORRECTION

PATENT NO. : 7,010,306 B1 Page 1 of 1
APPLICATION NO. : 09/786818
DATED : March 7, 2006
INVENTOR(S) : Youichi Tanibayashi et al.

It is certified that error appears in the above-identified patent and that said Letters Patent is hereby corrected as shown below:

Item (57) ABSTRACT

Line 7, after "may" insert --be--
Line 13, after "information" insert --to--

Column 43, Line 47, change "us" to --is--

Column 46, Line 16, change "claim" to --claims--

Column 46, Line 19, change "claim" to --claims--

Column 46, Line 23, change "claim" to --claims--

Column 46, Line 27, change "claim" to --claims--

Signed and Sealed this

Thirtieth Day of January, 2007

JON W. DUDAS
*Director of the United States Patent and Trademark Office*